(12) United States Patent
Razeem et al.

(10) Patent No.: US 11,667,753 B2
(45) Date of Patent: Jun. 6, 2023

(54) MULTIMODAL POLYALKYLENE TEREPHTHALATE

(71) Applicant: OCTAL, Inc., Plano, TX (US)

(72) Inventors: Mohammed Razeem, Plano, TX (US); Chris DeArmitt, Cincinnati, OH (US)

(73) Assignee: OCTAL, INC., Plano, TX (US)

( * ) Notice: Subject to any disclaimer, the term of this patent is extended or adjusted under 35 U.S.C. 154(b) by 0 days.

(21) Appl. No.: 17/719,947

(22) Filed: Apr. 13, 2022

(65) Prior Publication Data

US 2022/0235175 A1  Jul. 28, 2022

Related U.S. Application Data

(62) Division of application No. 17/097,965, filed on Nov. 13, 2020, now Pat. No. 11,434,326.

(60) Provisional application No. 62/942,659, filed on Dec. 2, 2019.

(51) Int. Cl.
*C08G 63/88* (2006.01)
*C08G 63/91* (2006.01)

(52) U.S. Cl.
CPC ................... *C08G 63/916* (2013.01)

(58) Field of Classification Search
CPC . C08G 63/88; C08G 63/183; C08L 2205/025; C08L 2666/18; C08L 67/02; C08L 67/03
See application file for complete search history.

(56) References Cited

U.S. PATENT DOCUMENTS

| 5,780,158 | A | * | 7/1998 | Asai | B32B 15/08 |
| | | | | | 428/458 |
| 7,655,291 | B2 | | 2/2010 | Ye | |
| 7,931,842 | B2 | | 4/2011 | Barakat et al. | |
| 8,969,433 | B2 | | 3/2015 | He et al. | |
| 2003/0022989 | A1 | | 1/2003 | Braig et al. | |
| 2009/0026641 | A1 | | 1/2009 | Barakat | |
| 2009/0026663 | A1 | * | 1/2009 | Ellington | C08L 69/00 |
| | | | | | 525/190 |
| 2009/0212457 | A1 | | 8/2009 | Barakat et al. | |
| 2011/0196098 | A1 | | 8/2011 | Mettlach et al. | |
| 2014/0227506 | A1 | | 8/2014 | Kuwabara et al. | |
| 2014/0275372 | A1 | | 9/2014 | He et al. | |
| 2014/0350139 | A1 | | 11/2014 | Urushihara et al. | |
| 2021/0054154 | A1 | | 2/2021 | Razeem et al. | |
| 2021/0163678 | A1 | | 6/2021 | Razeem et al. | |

FOREIGN PATENT DOCUMENTS

| AT | 596 527 | A1 | 9/2009 |
| CN | 102408686 | A | 4/2012 |
| CN | 103810826 | A | 6/2017 |
| CN | 108084424 | | 5/2018 |
| JP | 2004168876 | A | 6/2004 |
| JP | 2004526848 | A | 9/2004 |
| JP | 2005165015 | A | 6/2005 |
| JP | 2007100004 | A | 4/2007 |
| JP | 2013049790 | A | 3/2013 |
| JP | 2013129713 | A | 7/2013 |
| JP | 2014051542 | A | 3/2014 |
| JP | 2014159134 | A | 9/2014 |
| JP | 2014201660 | A | 10/2014 |
| JP | 2015048464 | | 3/2015 |
| JP | 2015048465 | A | 3/2015 |
| JP | 2018012836 | A | 1/2018 |
| WO | 2009021967 | A1 | 2/2009 |
| WO | 2013031769 | A1 | 3/2013 |
| WO | 2017180629 | | 10/2017 |
| WO | WO2017/18062 | * | 10/2017 |
| WO | 2019190572 | A1 | 10/2019 |
| WO | 2021113061 | A1 | 6/2021 |

OTHER PUBLICATIONS

United States Patent and Trademark Office; International Search Report and Written Opinion issued in Int'l App. No. PCT/US20/30520 dated Jan. 7, 2021; 9 pages.
Campanelli, J.R. et al.; A kinetic study of the hydrolytic degradation of polyethylene terephthalate at high temperatures; A Journal of Applied Polymer Science; 1993; vol. 48; Issue 3, pp. 443-451; DOI 10.1002/app.1993.070480309.
Noritake A. et al.; "Recycling of Polyethylene Terephthalate Using High-pressure Steam Treatment"; Polymer Journal; 2008; vol. 40, Issue 6; pp. 498-502; DOI: 10.1295/polymj.pj2007237.
Kelsey D. R. et al.; "Thermal stability of poly(trimethylene terephthalate)"; Polymer; 2005; vol. 46, Issue 21; pp. 8937-8946; DOI: 10.1016/j.polymer.2005.07.015.
International Search Report and Written Opinion issued in Int'l App. No. PCT/US18/31387 dated Jul. 23, 2018, 41 pages.
Jiang et al; "Effect of Nucleating Agents on Crystallization Kinetics of PET. eXPRESS Polymer Letters"; Apr. 7, 2007; vol. 1, No. 4; pp. 245-251.
Buntinx et al.; "Evaluation of the Thickness of Oxygen Transmission Rate Before and After Thermoforming Mono-and Multi-layer Sheets into Trays with Variable Depths, Polymers"; Dec. 22, 2014; vol. 6, No. 12; 25 pages.
Canadian Intellectual Property Office Examiner's Report dated Dec. 2, 2021 issued in CA App. No. 3094063, 4 pages.
Chilean Patent Office First Office Action dated Oct. 15, 2021 issued in CL App. No. 2458-2020, 20 pages.

(Continued)

Primary Examiner — Robert C Boyle
(74) Attorney, Agent, or Firm — Maschoff Brennan

(57) ABSTRACT

A method of forming a multimodal Polyalkylene Terephthalate (PAT) can include: providing a feed of a low molecular weight (LMW) PAT, the LMW PAT having a low average molecular weight; providing a feed of high molecular weight (HMW) PAT, the HMW PAT having a high average molecular weight, wherein the low average molecular weight is lower than the high average molecular weight; mixing the feed of LMW PAT with the feed of HMW PAT in a mixer to form a multimodal PAT; and providing the multimodal PAT as output. The multimodal PAT can include: a low average molecular weight of a low molecular weight (LMW) PAT; and a high average molecular weight of a high molecular weight (HMW) PAT mixed with the LMW PAT to form the multimodal PAT, wherein the multimodal PAT is devoid of talc.

22 Claims, 8 Drawing Sheets

(56) References Cited

OTHER PUBLICATIONS

European Patent Office, Extended European Search Report dated Nov. 23, 2021 issued in EP App No. 18913180.0, 16 pages.
Thomson Scientific et al., London GB; Database WPI—Week 201523, Mar. 16, 2015; AN 2015-18185G.
Thomson Scientific et al., London, GB; Database WPI—Week 201749; Jun. 9, 2017; AN 2017-40340W.
Thomson Scientific et al., London GB; Database WPI—Week 201460; Sep. 4, 2014; AN 2014-Q79420.
Intellectual Property India, Government of India; First Examination Report dated Dec. 20, 2021 issued in IN App. No. 202020746453; 6 pages.
Japanese Patent Office; Notice of Refusal dated Dec. 14, 2021, issued in JP App. No. 2020-552305; including machine translation: 46 pages.

* cited by examiner

| Resin 1 | Glycerol 20% (20% LMW 80% HMW) | | | | | 5s Pack Tim |
|---|---|---|---|---|---|---|
| Injection Speed (in/s) | 5 | 4 | 3 | 2 | 1 | 5 |
| Pack Pressure (psi) | 363 | 363 | 363 | 363 | 363 | 8000 |
| Fill Time (s) | 0.22 | 0.28 | 0.36 | 0.53 | 1.03 | 0.23 |
| Actual Peak Pressure (psi) | 14882 | 14345 | 12545 | 10456 | 8292 | 14983 |
| Cushion (in) | 1.001 | 1.028 | 1.051 | 1.072 | 1.088 | 0.256 |
| Cycle Time (s) | 39.570 | 39.620 | 39.710 | 39.800 | 40.380 | 39.570 |
| Length (in) | 21 | | | 19 | 18 | 39-40 |

| Resin 2 | Glycerol 25% (25% LMW 75% HMW) | | | | | 5s Pack Tim |
|---|---|---|---|---|---|---|
| Injection Speed (in/s) | 5 | 4 | 3 | 2 | 1 | 5 |
| Pack Pressure (psi) | 363 | 363 | 363 | 363 | 363 | 8000 |
| Fill Time (s) | 0.23 | 0.28 | 0.36 | 0.53 | 1.03 | 0.23 |
| Actual Peak Pressure (psi) | 14856 | 14255 | 12702 | 10741 | 7384 | 15140 |
| Cushion (in) | 1.001 | 1.027 | 1.051 | 1.072 | 1.089 | 0.226 |
| Cycle Time (s) | 39.570 | 39.650 | 39.700 | 39.870 | 40.370 | 39.580 |
| Length (in) | 21 | | | 20 | 17 | 41-42 |

| Resin 3 | Glycerol 30% (30% LMW 70% HMW) | | | | | 5s Pack Tim |
|---|---|---|---|---|---|---|
| Injection Speed (in/s) | 5 | 4 | 3 | 2 | 1 | 5 |
| Pack Pressure (psi) | 363 | 363 | 363 | 363 | 363 | 8000 |
| Fill Time (s) | 0.23 | 0.28 | 0.36 | 0.53 | 0.83 | 0.23 |
| Actual Peak Pressure (psi) | 14165 | 12623 | 10902 | 8928 | 5951 | 13566 |
| Cushion (in) | 1.000 | 1.028 | 1.050 | 1.072 | 1.089 | 0.138 |
| Cycle Time (s) | 39.580 | 39.620 | 39.720 | 39.880 | 40.380 | 39.800 |
| Length (in) | 21 | | | 20 | 17-19 | 43-45 |

| Resin 4 | Glycerol 35% (35% LMW 65% HMW) | | | | | 5s Pack Tim |
|---|---|---|---|---|---|---|
| Injection Speed (in/s) | 5 | 4 | 3 | 2 | 1 | 5 |
| Pack Pressure (psi) | 363 | 363 | 363 | 363 | 363 | 8000 |
| Fill Time (s) | 0.23 | 0.28 | 0.36 | 0.53 | 1.03 | 0.23 |
| Actual Peak Pressure (psi) | 13927 | 11199 | 10369 | 8781 | 6853 | 12863 |
| Cushion (in) | 1.001 | 1.026 | 1.051 | 1.072 | 1.089 | 0.143 |
| Cycle Time (s) | 39.610 | 39.670 | 39.760 | 40.480 | 41.950 | 44.020 |
| Length (in) | 22 | 21 | 20 | 20 | 19 | 44-47 |

Fig. 6

Project Information

Control

| Preform | Machine | Screw | Mixing Enhancements | Material |
|---|---|---|---|---|
| 4348 01 | #5 Arburg 420c | 35 mm GP | None | Control |

Ambient Conditions

| Temp (F) | Rel. Humidity % | Dew Point (f) | Mold Coolant (F) |
|---|---|---|---|
| 65.4 | 70.5 | 55.5 | 60 |

Barrel Temperature Settings (C)

| Feed | Zone 1 | Zone 2 | Zone 3 | Zone 4 | HR Body | HR Tip | Open Delay (Sec) | Close Delay (Sec) |
|---|---|---|---|---|---|---|---|---|
| 260 | 260 | 260 | 260 | 260 | N/A | N/A | N/A | N/A |

Screw Recovery

| Shot Size (ccm) | Screw Spd. (m/min) | Back Press (bar) | Cooling Time (sec) |
|---|---|---|---|
| 16.00 | 6.0 | 25 | 9.5 |

| Recovery Time (sec) | Decompression Vol. (ccm) | Decompression Rate (ccm/sec) |
|---|---|---|
| 3.51 | 1.5 | 10.0 |

| Mold Filling | Volume (ccm) | Rate (ccm/sec) | Press (bar) | Switchover Press (bar) |
|---|---|---|---|---|
| Shot Size: | 16 | 12 | 850 | 550 |
| Position 1: | 14 | 10 | 850 | |
| Switchover: | 4.25 | | | |
| Cushion: | 3.25 | | | |

| Pack & Hold | Time (sec) | Press (bar) | Rate (ccm/sec) |
|---|---|---|---|
| Ramp/1: | 0 | 300 | 10.0 |
| 2: | 2.5 | 300 | |

Process Data

| Cycle Time (sec) | Fill Time (sec) | Recovery Time (sec) | Hydraulic Press (bar) | Plastic Press (bar) | Cushion (ccm) |
|---|---|---|---|---|---|
| 18.54 | 1.63 | 3.51 | 55 | 550 | 3.25 |

Preform Data

| SIV (dl/g) | Weight (g) | TIR End Cap (in) | TIR Body (in) | Length (mm) | Thickness (mm) | L/t (mm) |
|---|---|---|---|---|---|---|

Fig. 7A

Project Information

Octal ClearFlow

| Preform | Machine | Screw | Mixing Enhancements | Material |
|---|---|---|---|---|
| 4348 01 | #5 Arburg 420c | 35 mm GP | None | Control |

Ambient Conditions

| Temp (F) | Rel. Humidity % | Dew Point (f) | Mold Coolant (F) |
|---|---|---|---|
| 71.6 | 74.4 | 62.9 | 60 |

Barrel Temperature Settings (C)

| Feed | Zone 1 | Zone 2 | Zone 3 | Zone 4 | HR Body | HR Tip | Open Delay (Sec) | Close Delay (Sec) |
|---|---|---|---|---|---|---|---|---|
| 265 | 265 | 265 | 265 | 265 | N/A | N/A | N/A | N/A |

Screw Recovery

| Shot Size (ccm) | Screw Spd. (m/min) | Back Press (bar) | Cooling Time (sec) |
|---|---|---|---|
| 16.00 | 6.0 | 25 | 9.5 |

| Recovery Time (sec) | Decompression Vol. (ccm) | Decompression Rate (ccm/sec) |
|---|---|---|
| 3.97 | 1. | 10.0 |

| Mold Filling | Volume (ccm) | Rate (ccm/sec) | Press (bar) | Switchover Press (bar) |
|---|---|---|---|---|
| Shot Size: | 16 | 12 | 850 | 270 |
| Position 1: | 14 | 10 | 850 | |
| Switchover: | 4.25 | | | |
| Cushion: | 3.25 | | | |

| Pack & Hold | Time (sec) | Press (bar) | Rate (ccm/sec) |
|---|---|---|---|
| Ramp/1: | 0 | 150 | 10.0 |
| 2: | 2.5 | 150 | |

Process Data

| Cycle Time (sec) | Fill Time (sec) | Recovery Time (sec) | Hydraulic Press (bar) | Plastic Press (bar) | Cushion (ccm) |
|---|---|---|---|---|---|
| 18.5 | 1.57 | 3.97 | 27 | 270 | 3.13 |

Preform Data

| SIV (dl/g) | Weight (g) | TIR End Cap (in) | TIR Body (in) | Length (mm) | Thickness (mm) | L/t (mm) |
|---|---|---|---|---|---|---|

Fig. 7B

MULTIMODAL POLYALKYLENE TEREPHTHALATE

CROSS-REFERENCE TO RELATED APPLICATIONS

This patent application is a divisional of U.S. application Ser. No. 17/097,965 filed Nov. 13, 2020, which claims priority to U.S. Provisional Application No. 62/942,659 filed Dec. 2, 2019, which applications are incorporated herein by specific reference in their entirety.

BACKGROUND

Field

The present disclosure relates to compositions and methods for forming multimodal polyalkylene terephthalate with improved flow, good mechanical properties and desirable optical properties.

Description of Related Art

Polyethylene Terephthalate (PET) is a crystallizable polymer, which crystallization influences many properties, such as clarity, stiffness and strength of the PET product. The high molecular weight of commercial PET leads to poor flow properties, which precludes the manufacture of thin-walled injection molded parts with PET. Attempts to improve PET flow have included particles that result in opaque or unclear materials.

A PET polymer having better flow, while maintaining the good strength properties and clear optical properties of PET is desirable. PET is a polyalkylene terephthalate (PAT).

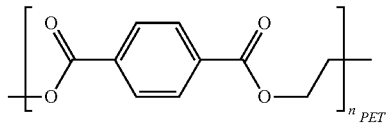

SUMMARY

In some embodiments, a method of forming low molecular weight polyalkylene terephthalate (PAT) can include: providing a feed of high molecular weight (HMW) PAT, the HMW PAT having a high average molecular weight; providing a feed of a degrading molecule; reacting the HMW PAT with the degrading molecule in a reactor; degrading the HMW PAT with the degrading molecule into low molecular weight (LMW PAT) having a low average molecular weight that is lower than the high average molecular weight; and providing the LMW PAT as output.

In some embodiments, a system for forming LMW PAT can include: a feed line having high molecular weight (HMW) PAT, the HMW PAT having a high average molecular weight; a feedline of a degrading molecule; a reactor having the HMW PAT with the degrading molecule; and an output having low molecular weight (LMW PAT) with a low average molecular weight that is lower than the high average molecular weight.

In some embodiments, a method of forming a multimodal Polyalkylene Terephthalate (PAT) can include: providing a feed of a low molecular weight (LMW) PAT, the LMW PAT having a low average molecular weight; providing a feed of high molecular weight (HMW) PAT, the HMW PAT having a high average molecular weight, wherein the low average molecular weight is lower than the high average molecular weight; mixing the feed of LMW PAT with the feed of HMW PAT in a mixer to form a multimodal PAT; and providing the multimodal PAT as output. As used herein, "multimodal" or "blended" means that two or more compositions of different molecular weights of PAT are blended together to form a composition having a fraction with LMW PAT blended with a fraction with HMW PAT as well as other fractions of different molecular weights, such that the blended PAT is formed to be multimodal (e.g., having at least two different polymer composition molecular weights blended together). The blended PAT may be bimodal, trimodal, or other multimodal, but may also include only a single distribution (e.g., single chromatographical peak) populated by the fraction of LMW PAT blended with the fraction of HMW PAT as well as any other fractions with a different molecular weight (e.g., additional LMW PATs, additional HMW PATs, or medium range molecular weight PATs). The blend may be homogeneous or inhomogeneous. The result is that at least two different compositions with at least two different molecular weights are blended to form the multimodal PAT.

In some embodiments, a system for forming multimodal PAT can include: a feed of a low molecular weight (LMW) PAT, the LMW PAT having a low average molecular weight; a feed of high molecular weight (HMW) PAT, the HMW PAT having a high average molecular weight, wherein the low average molecular weight is lower distribution than the high average molecular weight; a mixer having the LMW PAT and HMW PAT; and an output having multimodal PAT.

In some embodiments, a multimodal PAT can include: a low average molecular weight of a low molecular weight (LMW) PAT; and a high average molecular weight of a high molecular weight (HMW) PAT mixed with the LMW PAT to form the multimodal PAT, wherein the multimodal PAT is devoid of talc.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 shows injection molding properties with different multimodal PET compositions.

FIG. 7A shows injection molding properties for control PET.

FIG. 7B shows injection molding properties for the multimodal PET.

Figure 1:
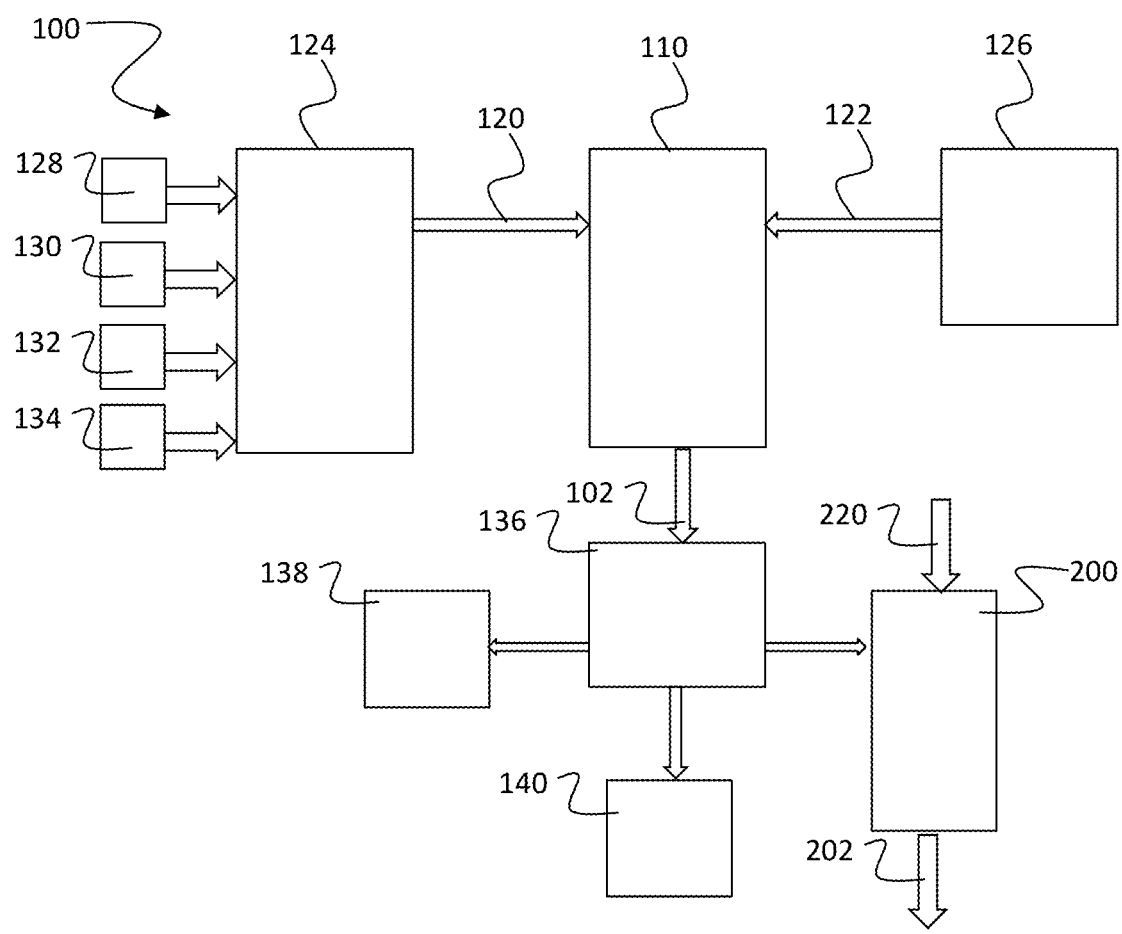
FIG. 1 is a schematic representation of a system for degrading HMW PET into LMW PET.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology includes systems and methods for preparing multimodal PET, where the multimodal PET includes a first average molecular weight and a second average molecular weight. The first average molecular weight (e.g., first average molecular weight with a standard distribution that has a first intrinsic viscosity) includes a lower average molecular weight compared to the higher second average molecular weight (e.g., second average molecular weight with a standard distribution that has a second intrinsic viscosity). As such, the first mode is the low average molecular weight (e.g., first low average molecular weight with a standard distribution that has a first low intrinsic viscosity) and the second mode is the high average molecular weight (e.g., second high average molecular weight with a standard distribution that has a second high intrinsic viscosity). The first mode having the low average molecular weight is obtained by taking a higher average molecular weight PET composition and degrading it with a degrading molecule, such as water, alcohol, diol, and polyol (e.g., including 3 or more hydroxyl groups). A small molecule polyol (not a polymer) is an example of a degrading molecule that can be used to degrade the high average molecular weight PET composition into a PET master batch that has the first low average molecular weight. The low average molecular weight PET master batch is then combined with the high average molecular weight PET composition having the second average molecular weight. The degrading molecule may be characterized as a molecule, and is not a mineral.

In some embodiments, the multimodal PET can be substituted with any multimodal polyalkylene terephthalate (PAT). As such, reference to a PET can generally refer to a PAT unless specifically including the PET, and a reference to PAT can include PET and other PATs.

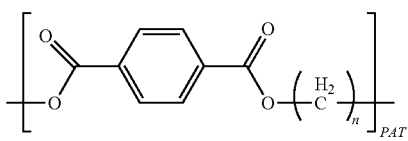

In some embodiments, the present technology includes a system and method for preparing a multimodal Polyethylene Terephthalate (PET) having two or more separate average molecular weights. The multimodal PET is formed with a system that prepares a first PET composition with a lower average molecular weight, and then combines the first PET composition with a second PET composition with a higher average molecular weight in order to produce the bimodal PET composition. Additional PET compositions with different molecular weights may also be added and blended. Accordingly, the system and method can be used to produce the first PET composition (e.g., low molecular weight PET, or LMW PET) that is manufactured in a precise manner, and which LMW PET is then blended with a second PET (e.g., fresh PET, virgin PET, recycled PET, off-spec PET, or high molecular weight PET, or HMW PET) to form the multimodal PET composition that has better flow characteristics than PET, while maintaining the other desirable properties of PET, such as tensile strength and flexural yield strength as well as favorable optical properties, such as being clear or substantially clear (e.g., hazy clear, which is optically transmissive and translucent).

In some embodiments, if LMW PET is available commercially, it can be purchased and then combined with HMW PET to make the multimodal PET described herein. However, LMW PET does not have any significant uses on its own due to having unfavorable mechanical properties. As a result, LMW PET is not commercially available. As such, the methods can include preparing the LMW PET from other PET (e.g., virgin, recycled, off-spec, etc.) as described herein to get the LMW PET that has high flow properties. The LMW PET with high flow properties can be combined with the HMW PET with the low flow properties in order to make the multimodal PET that has suitable flow properties as well as the suitable mechanical properties. Accordingly, the methods can be modulated to include obtaining the LMW PET instead of making it as described herein.

The multimodal PET can be favorable for products because of the oxygen and moisture barrier properties, which allows for PET articles to be containers for liquid storage, such as for beverages (e.g., soft drinks, water, beer, etc.). The high mechanical strength of the multimodal PET can allow for use in tapes, such as a carrier for magnetic tape or a backing for pressure-sensitive adhesive tapes, or the like. The optically clear properties, while in some embodiments being hazy, allows for the PET to be used in products that customers are accustomed to having in clear plastic. The clear PET thereby is suitable for a larger range of products than pure PET or other PET alloys (e.g., not clear).

In some embodiments, the multimodal PET can be modulated with the processing and amount of degrading molecule in the LMW PET as well as the relative amounts of the LMW PET and the HMW PET that are combined into the multimodal PET. The multimodal PET can have variations in the amounts of LMW PET and the amount of HMW PET that forms the multimodal PET, where the relative amounts (e.g., LMW/HWM ratio) can be controlled for different physical properties. The multimodal PET can include low molecular weight PET (LMW PET) mixed with high molecular weight PET (HMW PET) to obtain a faster or otherwise improved flow, and thereby now the multimodal PET can be used in injection molding, such as for the manufacture of thin-walled injection molded parts, as well as extrusion to form a variety of extrudates, such as fibers and cylinders for pelletizing with a chopper.

In some embodiments, the improved systems and methods can now be used to produce the multimodal PET that is manufactured in a precise manner, where LMW PET is then blended with virgin PET (e.g., HMW PET) to form the multimodal PET material, which has better mechanical properties.

The multimodal PET may be formed into an amorphous (transparent) article, or a semi-crystalline article. The semi-crystalline material can appear transparent. The lack of any particles (e.g., lack of talc) allows for the clear and transparent optical properties. As such, the present multimodal composition can be devoid of talc or other particulates in the polymer composition during manufacturing, injection molding, or other process.

In one example, the PET feed material for either the LMW PET or the HMW PET can be prepared by any suitable process. For example, the HMW PET can be reacted with the degrading molecule in order to form the LMW PET. As generally known, the monomer bis(2-hydroxyethyl) terephthalate can be synthesized by the esterification reaction between terephthalic acid and ethylene glycol with water as a byproduct, or by transesterification reaction between ethylene glycol and dimethyl terephthalate (DMT) with methanol as a byproduct. Polymerization is through a polycondensation reaction of the monomers (e.g., done immediately after esterification/transesterification) with water as the byproduct. The PET feed material can be prepared as described in U.S. 2009/0212457, which is incorporated herein by specific reference in its entirety. The PET feed material may be a sheet, pellet or other form as well as liquid PET. The PET feed material can be processed so that it is a liquid and flowable state for the methodologies described herein.

In some embodiments, a method of forming the LMW PET for use in preparing the multimodal PET is provided. Such a method can be performed with a PET system 100, such as shown in FIG. 1. The PET system 100 for forming LMW PET can include: a feed of PET 120 (PET feed); a feed of degrading molecule 122 (e.g., small molecule polyol feed); and a reactor 110 (e.g., reactor mixer) coupled to an outlet of the PET feed 120 and coupled to an outlet of the degrading molecule feed 122. The reactor 110 is capable of reacting the PET with the degrading molecule to form the LMW PET. The system 100 can also include an output of LMW PET 102 operably coupled to an outlet of the reactor 110 to another process component 136. The process component 136 can be selected from a container, pump, flow line, heater, cooler, extruder, die, pelletizer, mixer, and combinations thereof as well as other art-known components for PET systems. As shown, the system 100 can include the PET feed 120 having an inlet coupled to a PET supply 124.

It should be recognized that the PET may be substituted by PAT or any other type of PAT in the method and system 100 and in all of the methods and systems described herein and in all of the figures. That is, the systems may be configured for use with any PAT, and thereby the recitations of PET may also refer to PAT herein and for the other methods and other systems provided herein. For example, the PET system 100 may be a PAT system 100, and so on.

The system 100 may also include the degrading molecule feed 122 having an inlet coupled to a degrading molecule supply 126. The system 100 can include one or more of: a PET reactor system 128; a PET recycling system 130; a PET conditioning system 132; or a PET reservoir 134. The PET reactor system 128 is configured to polymerize the PET from PET precursor reagents. The PET recycling system 130 is configured to recycle the PET from PET articles. The PET conditioning system 132 is configured to condition the PET for reacting with the degrading molecule, the conditioning selected from one or more of heating, chopping PET pellets or sheets or other PET member, agitating, extruding, drying; off-gassing, or the like. The PET reservoir 134 includes liquid PET, wherein the liquid PET is melted PET.

The system 100 includes the reactor 110, which can be any reactor capable of reacting liquid PET and the degrading molecule in batch or continuous formats. Any type of industrial reactor vessel can be used. In some aspects, the reactor 110 also performs one or more of: degassing, homogenizing, dispersing, or heating.

In some aspects, the reactor 110 is configured as a mixer, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), continuous plow mixer (e.g., B&P Littleford).

The system 100 can include a PET storage 138. The PET storage 138 can be in any format and the LMW PET may be included therein in any format (e.g., solid, liquid, pellets, etc.). However, the LMW PET can be pelletized prior to entering the storage or formed into any other storable format (e.g., molten liquid).

The system 100 can include an analytical system 140. The analytical system 140 includes one or more analytical equipment capable of various analytical processes. For example, the analytical system 140 can be configured for determining intrinsic viscosity of melted LMW PET output 102. In another example, the analytical system 140 can be configured for determining flow rate of melted LMW PET output 102. In another example, the analytical system 140 can be configured for determining melting point of LMW PET output 102. In another example, the analytical system 140 can be configured for determining crystallization temperature of LMW PET output 102. In another example, the analytical system 140 can be configured for determining a differential scanning calorimetry profile of the LMW PET output 102. In another example, the analytical system 140 can be configured for determining heat distortion temperature of LMW PET output 102.

In accordance with the system 100 for forming the LMW PET, a method can be performed for forming the LMW PET. Such a method can include: providing a feed of PET 120 (PET feed, HMW PET); providing a feed of degrading molecule 122 (degrading molecule feed); reacting the feed of PET with the feed of degrading molecule in a reactor 110 to degrade the PET from a high molecular weight to obtain a low molecular weight PET (LMW PET); and providing the LMW PET as output 102. In some aspects, the PET feed 120 is from a PET supply 124. In some aspects, the degrading molecule feed 122 is from a degrading molecule supply 126.

In some embodiments, the PET supply 124 receives the PET feed from one or more of: a PET reactor system 128; a PET recycling system 130; a PET conditioning system 132; or a PET reservoir 134. The PET reactor system 128 polymerizes the PET from PET precursor reagents. The PET recycling system 130 recycles the PET from PET articles. The PET conditioning system 132 conditions the PET for mixing with talc, the conditioning selected from one or more of heating, chopping PET pellets or sheets or other PET member, agitating, extruding, drying; off-gassing. The PET reservoir 134 of liquid PET, wherein the liquid PET is melted PET. The PET supply 124 includes HMW PET.

The method can also include providing the LMW PET output 102 to an output system 136. The output system 136 provides the LMW PET to storage 138 (e.g., in pellets) or a multimodal PET system 200 or an analytical system 140. The method may include pelletizing the LMW PET output 102 with a pelletizer. The method can include analyzing the LMW PET output 102 with the analytical system 140, which can include: determining intrinsic viscosity of melted LMW PET output 102; determining flow rate of melted LMW PET output 102; determining melting point of LMW PET output 102; determining crystallization temperature of LMW PET output 102; determining a differential scanning calorimetry profile of LMW PET output 102; or determining heat distortion temperature of LMW PET output 102.

The multimodal PET system 200 is described in detail below. However, in some aspects, the multimodal PET system 200 is configured to combine the LMW PET output 102 with a second feed of PET 220 (second PET feed, HMW PET) to produce the multimodal PET 202 that has a combination of the LMW PET and HMW PET in a single multimodal composition. This produces a composition with a multimodal distribution of two different average molecular weights of PET.

In some aspects, the PET feed 120 is devoid of another polymer. In another aspect, the degrading molecule feed 122 is devoid of another polymer. However, the PET feed 120 and/or degrading molecule feed 122 may include other polymers, such as a PAT as defined herein or a polycarbonate. In some aspects, the PET feed 120 consists essentially (or consists of) of PET. In some aspects, the degrading molecule feed 122 consists essentially (or consists of) degrading molecule (optionally with a carrier, such as a solvent). In some aspects, the PET feed 120 includes melted PET.

In some embodiments, the PET feed 120 includes water at an amount less than 5%, or less than 1%, or less than 0.1%, or a trace amount of water or is devoid of water. Accordingly, the method can include drying the PET feed 120 before reacting with the degrading molecule feed 122. Also, the method can include drying (e.g., removing water) the degrading molecule feed 122 before reacting with the PET feed 120. However, the degrading molecule may be water, and thereby the degrading molecule may include water in the degrading molecule feed 122. In some aspects, the degrading molecule is a small molecule polyol or alcohol, and water may be present, which can be allowable.

In some embodiments, the method can include preparing the PET. As such, the method may include polymerizing the PET from polymerizable reagents.

In some embodiments, the provided LMW PET output 102 has an intrinsic viscosity of from about 0.4 to about 0.6, or about 0.42 to about 0.55, or about 0.45 to about 0.52, or about 0.46 to about 0.5. In an example, the intrinsic viscosity of the LMW PET can be about 0.477. Herein, the intrinsic viscosity can be provided as an indication of molecular weight. The LMW PET has an intrinsic viscosity lower than the feed or virgin PET or HMW PET.

Figure 2:
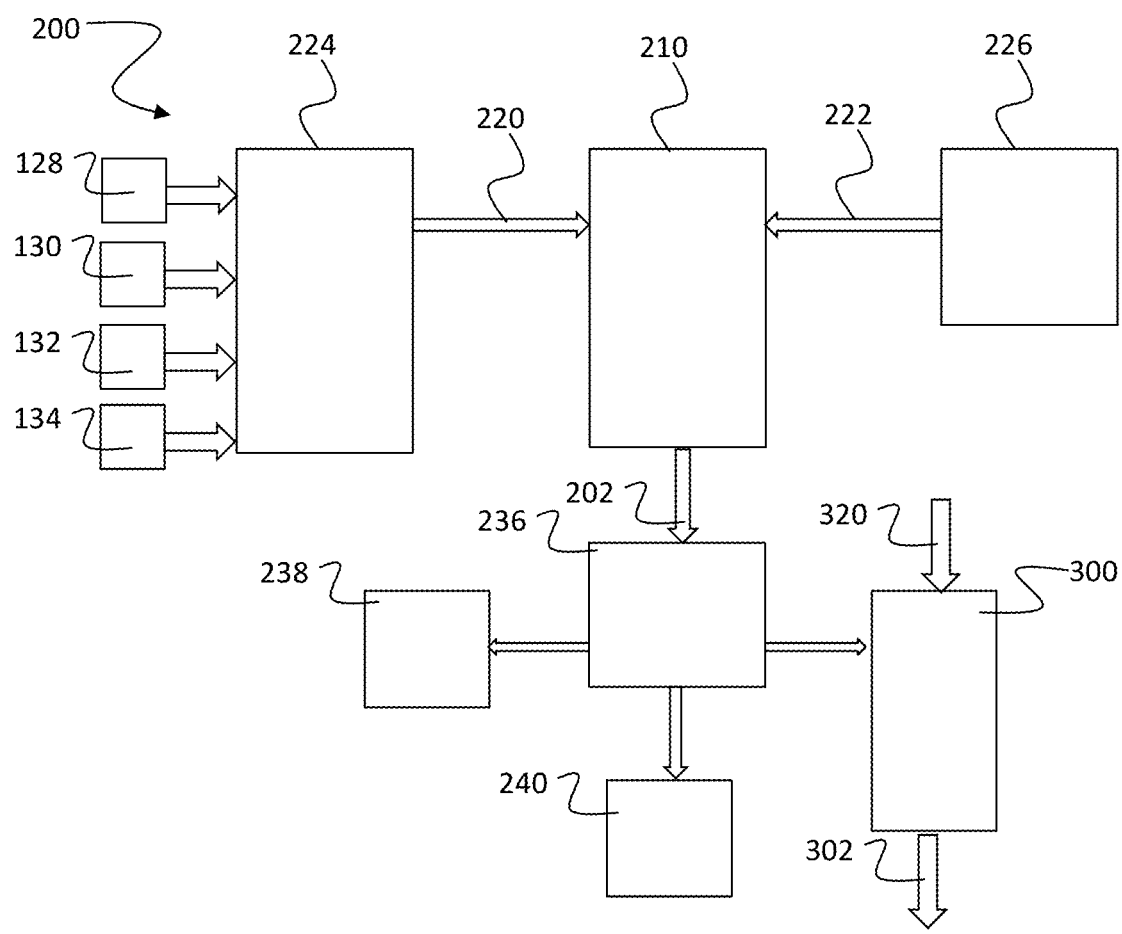
FIG. 2 is a schematic representation of a system for preparing multimodal PET from LMW PET and HMW PET mixture.

A method of forming the multimodal PET can be performed with the system 200 of FIG. 2. A system 200 for forming the multimodal PET can include a feed of HMW PET 220 (HMW PET feed), which can include any type of PET, such as virgin PET, recycled PET, or other source of PET (e.g., with or without other polymers, additives, etc.) so long as it has a higher molecular weight compared to the LMW PET formed in the system 100. The system 200 can also include a feed of LMW PET (LMW PET feed), which can be the LMW PET output 102 obtained from the method used with the system 100 of FIG. 1. The system 200 can include a mixer 210 coupled to an outlet of the HMW PET feed 220 and coupled to an outlet of the LMW PET feed 222, wherein the mixer 210 is capable of mixing to form the multimodal PET having an LMW distribution (e.g., lower average molecular weight and distribution of lower molecular weights around the lower average molecular weight) and a HMW distribution (e.g., higher average molecular weight and distribution of higher molecular weights around the higher average molecular weight). The system 200 can include a process component 236 operably coupled to an outlet of the mixer 210, wherein the process component 236 is selected from a container, pump, flow line, heater, cooler, extruder, die, pelletizer, and combinations thereof.

In some embodiments, the system 200 can include the HMW PET feed 220 having an inlet coupled to an HMW PET supply 224. The PET supply 224 can be of the same type as the PET supply 124 of the system 100 of FIG. 1. The system 200 can include a PET reactor system 128 that that is configured for polymerizing the HMW PET from PET precursor reagents. The system 200 can include a PET recycling system 130 that is configured for recycling the PET from PET articles, which results in HMW PET. The system 200 can include a PET conditioning system 132 that is configured for conditioning the HMW PET for mixing with LMW PET, the conditioning selected from one or more of heating, chopping PET pellets or sheets or other PET member, agitating, extruding, drying, off-gassing, or other conditioning. The system 200 can include a HMW PET reservoir 134 of solid HMW PET pellets or liquid HMW PET, wherein the liquid HMW PET is melted PET. A heating system may also be included to heat the HMW PET to the appropriate temperature and to liquefy the solid HMW PET pellets, where such a heating system can be included in any system component or flow line.

In some embodiments, the system 200 can include the LMW PET feed 222 having an inlet coupled to a LMW PET supply 226. The LMW PET supply 226 can include the LMW PET output 102, and may be a solid pellet form or a molten liquid form. In some aspects, the LMW PET supply 226 includes the LMW PET in a flowable format and/or includes a heater to heat the LMW PET into a flowable format (e.g., molten PET liquid). In some aspects, the LMW PET omits any particles (e.g., non-PET particles), such as by omitting any talc particles.

In some embodiments, the mixer 210 is any mixer capable of mixing liquid HMW PET and LMW PET in batch or continuous formats, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), continuous plow mixer (e.g., B&P Littleford), or other. The mixer 210 is configured to perform one or more of: degassing, homogenizing, dispersing, or heating.

In some embodiments, the system 200 can include storage 238. The storage 238 may include the multimodal PET in any format, such as heated liquid or a solid (e.g., pelletized solid).

The system 200 can include an analytical system 240. The analytical system 240 includes one or more analytical equipment capable of various analytical processes. For example, the analytical system 240 can be configured for determining intrinsic viscosity of melted multimodal PET output 202. In another example, the analytical system 240 can be configured for determining flow rate of melted multimodal PET output 202. In another example, the analytical system 240 can be configure for determining a melting point of multimodal PET output 202. In another example, the analytical system 240 can be configured for determining crystallization temperature of multimodal PET output 202. In another example, the analytical system 240 can be configured for determining a differential scanning calorimetry profile of multimodal PET output 202. In another example, the analytical system 240 can be configured for determining heat distortion temperature of multimodal PET output 202.

In some embodiments, the system 200 can include a manufacturing system 300 that is configured to convert the multimodal PET output 202 into an article of manufacture 302. The manufacturing system 300 can include an optional component input feed 320. The optional component input feed 320 can be configured to provide an optional component to the multimodal PET. The optional component can be selected from a filler, $TiO_2$, second polymer, glass pellets, glass fibers, glass particles, sodium ionomers, sodium stearate, nucleating agent, polycarbonate, polybutylene terephthalate (PBT) or other polyalkylene terephthalate (PAT), or other component of a PET article of manufacture 302. The optional component can be devoid of talc.

Figure 3:
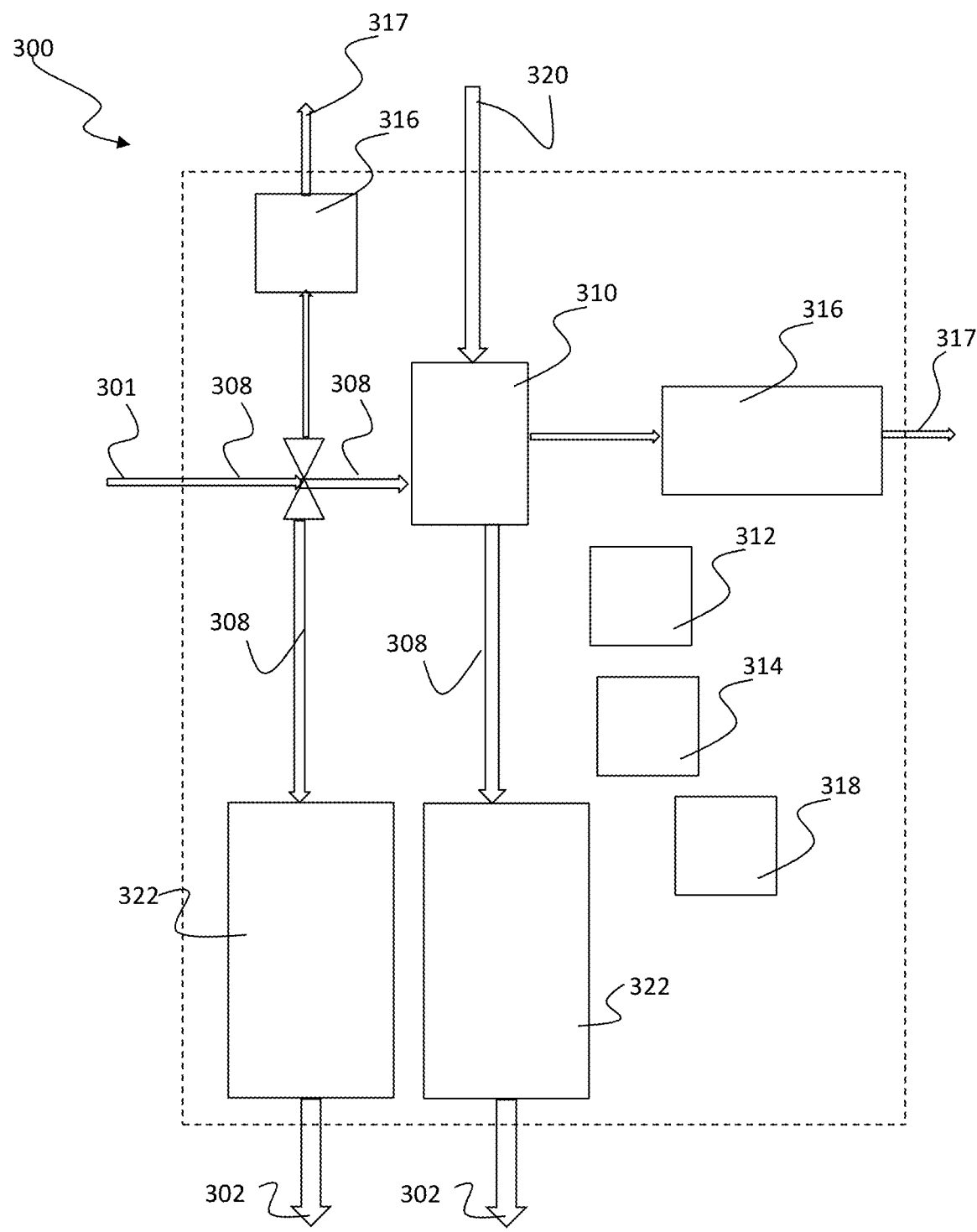
FIG. 3 is a schematic representation of a system for preparing multimodal PET into different articles, and optionally with additional optional components.

As shown in FIG. 3, the manufacturing system 300 can include one or more of: a multimodal PET feed 301; one or more flow channels 308 containing flowable multimodal PET; a mixer 310; a heating system 312; an extruder system 316 that produces multimodal PET extrudate 317; a pumping system 318 an injection molding system 322; and/or a cooling system 314.

In some embodiments, the optional component (e.g., not talc) can be provided into the reactor 110 to be mixed into the LMW PET output 102, or provided into the mixer 210 to be mixed into the multimodal PET output 202. Alternatively, the provided HMW PET 220 may include the optional component or the provided LMW PET 222 may be prepared to include the optional component. Thus, the optional component can be introduced into the PET at any stage in the processing described herein.

The system 200 can have various modifications, such as those described herein. In some aspects, the HMW PET feed 220 is devoid of another polymer. In some aspects, the LMW PET feed 222 is devoid of another polymer. In some aspects, the HMW PET feed 220 consists essentially (or consists of) of HMW PET. In some aspects, the LMW PET feed 222 consists essentially (or consists of) LMW PET (optionally with trace water and some of the degrading molecule). In some aspects, the HMW PET feed 220 includes melted HMW PET. In some aspects, the HMW PET feed 220 includes water at an amount less than 5%, or less than 1%, or less than 0.1%, or a trace amount of water or is devoid of water. It should be recognized that some of the degrading molecule may be retained in the LMW PET, and thereby may be present in the resulting multimodal PET.

In some embodiments, the system 200 can include a dryer for drying the HMW PET feed 220 before mixing with the LMW PET feed 222. In some embodiments, the system 200 can include a dryer for drying the LMW PET feed 222 before mixing with the HMW PET feed 220. Such a dryer can be included in any location in the system 200 or any suitable component may be outfitted with a dryer. The dryer can facilitate water removal in order to enhance processing and preparation of the multimodal PET.

In some embodiments, the provided HMW PET feed 220 of the system 200 has an intrinsic viscosity of 0.55 or more, such as from about 0.6 to about 0.9, or about 0.625 to about 0.85, or about 0.65 to about 0.8, or about 0.7 to about 0.75, or about 0.76. In an example, the HMW PET feed includes an intrinsic viscosity of about 0.786 or 0.79. The higher intrinsic viscosity is indicative of the higher molecular weight compared to the LMW PET.

In some embodiments, the provided multimodal PET output 102 has an intrinsic viscosity of from about 0.45 to about 0.7, or about 0.475 to about 0.6, or about 0.5 to about 0.58, or about 0.51 to about 0.56, or about 0.55. An example range can be from 0.5 to 0.6 intrinsic viscosity. In an example, the multimodal PET output 102 has an intrinsic viscosity of about 0.518 or about 0.52, or about 0.55. Here, the intrinsic viscosity of the multimodal PET is between the intrinsic viscosity of the LMW PET and HMW PET, and thereby has a distribution of each.

In some embodiments, a method of forming the multimodal PET can be performed with the system 200 as described herein. The method of forming the multimodal PET can include: providing a feed of HMW PET 220 (PET feed); providing a feed of LMW PET 222 (LMW PET feed); mixing the feed of HMW PET 220 with the feed of LMW PET 222 in a mixer 210 to form the multimodal PET having a first distribution of LMW PET and a second distribution of the HMW PET; and providing the multimodal PET as output 202. In some aspects, the HMW PET feed 220 is from a HMW PET supply 224, such as described herein. In some aspects, the LMW PET feed 122 is from a LMW PET supply 226, such as described herein.

In some embodiments, the method can include the LMW PET supply 224 receiving the LMW PET feed from one or more of: a PET reactor system 128; a PET recycling system 130; a PET conditioning system 132; or a PET reservoir 134. The PET reactor system 128 can polymerize the PET from PET precursor reagents, which results in HMW PET. The PET recycling system 130 can recycle the PET from PET articles. The PET conditioning system 132 can condition the PET for mixing with LMW PET, the conditioning selected from one or more of heating, chopping PET pellets or sheets or other PET member, agitating, extruding, drying; off-gassing. The PET reservoir 134 can retain the PET in a solid state (e.g., pellets) or as liquid PET, wherein the liquid PET is melted PET. The LMW PET can be obtained as described herein, such as in FIG. 1.

In some embodiments, the multimodal PET output 202 is provided to a process component 236. The process component 236 provides the multimodal PET to storage 238 or an analytical system 240 or a manufacturing system 300. The storage 238 may be adapted to retain the multimodal PET as a liquid, such as by including heaters, or as pellets, whereby the output system 236 may include a pelletizer to pelletize the multimodal PET. In some aspects, the analytical system 240 includes one or more analytical systems capable of performing one or more of the following analytical methods on the multimodal PET: determining intrinsic viscosity of melted multimodal PET output 202; determining flow rate of melted multimodal PET output 202; determining melting point of multimodal PET output 202; determining crystallization temperature of multimodal PET output 202; determining a differential scanning calorimetry profile of multimodal PET output 202; or determining heat distortion temperature of multimodal PET output 202. In some aspects, the manufacturing system 300 is operated to convert the multimodal PET output 202 into an article of manufacture. In some aspects, the article of manufacture can be a multimodal PET pellet. In some aspects, the article of manufacture can include other components, which can be introduced into the PET alloy in the system 300 or other system as described herein. The manufacturing system 300 is described in more detail herein.

In some embodiments, the method includes providing the HMW PET feed 220 that is devoid of another polymer. In some aspects, the method can include providing the LMW PET feed 222 that is devoid of another polymer. In some aspects, the method can include providing the HMW PET feed 220 that consists essentially (or consists of) of PET. In another aspect, the method can include providing the LMW PET feed 222 that consists essentially (or consists of) PET, but may include some of the degrading molecule. In some aspects, the method includes providing the HMW PET feed 220 and/or LMW PET feed 222 as melted PET. In some aspects, the method includes providing the HMW PET feed 220 and/or LMW PET feed 222 that includes water at an amount less than 5%, or less than 1%, or less than 0.1%, or a trace amount of water or is devoid of water.

In some embodiments, the method can include drying the PET feed 220 before mixing with the LMW PET feed 222. In some aspects, the method can include drying the LMW PET feed 222 before mixing with the HMW PET feed 220.

In some embodiments, the method includes producing the multimodal PET output 102 to have an intrinsic viscosity of from about 0.45 to about 0.7, or about 0.475 to about 0.6, or about 0.5 to about 0.55, or about 0.51 to about 0.53. In an example, the multimodal PET output 102 has an intrinsic viscosity of about 0.518 or about 0.52.

In some embodiments, the system 200 can include a manufacturing system 300 that is configured to convert the multimodal PET output 202 into an article of manufacture 302. The manufacturing system 300 can include an optional component input feed 320. The optional component input feed 320 can be configured to provide an optional component to the multimodal PET. The optional component can be selected from a filler, $TiO_2$, second polymer, glass pellets, glass fibers, glass particles, sodium ionomers, sodium stearate, nucleating agent, polycarbonate, polybutylene terephthalate (PBT) or other polyalkylene terephthalate (PAT), or other component of a PET article of manufacture 302. However, the system can specifically exclude any optional components from the multimodal PET, and may specifically exclude using any talc to produce the multimodal PET.

As shown in FIG. 3, the manufacturing system 300 can include one or more of: a multimodal PET feed 301; one or more flow channels 308 containing flowable multimodal PET; a mixer 310; a heating system 312 capable of heating any component of the system 300; an extruder system 316 that produces multimodal PET extrudate 317 (e.g., which may also include a pelletizer to pelletize the multimodal PET extrudate 317; a pumping system 318 that can pump the multimodal PET to any component in the system 300; an injection molding system 322; and/or a cooling system 314 that can cool any component in the system.

Figure 5A:
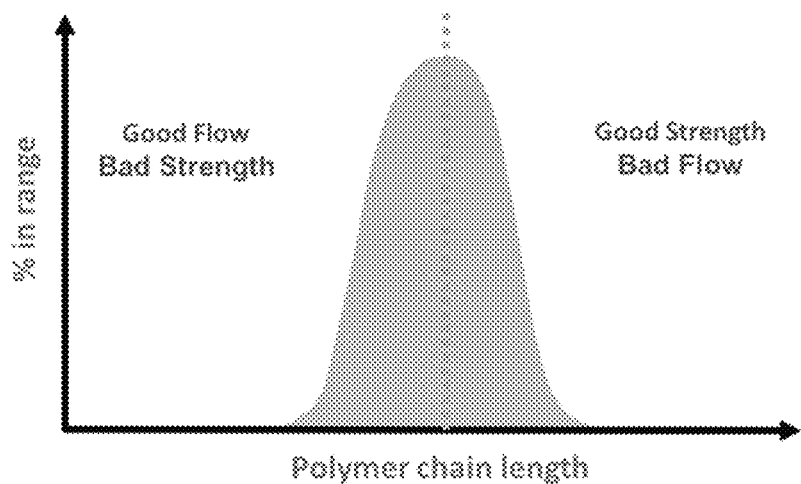
FIGS. 5A-5C show the relationship of flow and strength versus the PET polymer chain length and for multimodal PET.
Figure 5B:
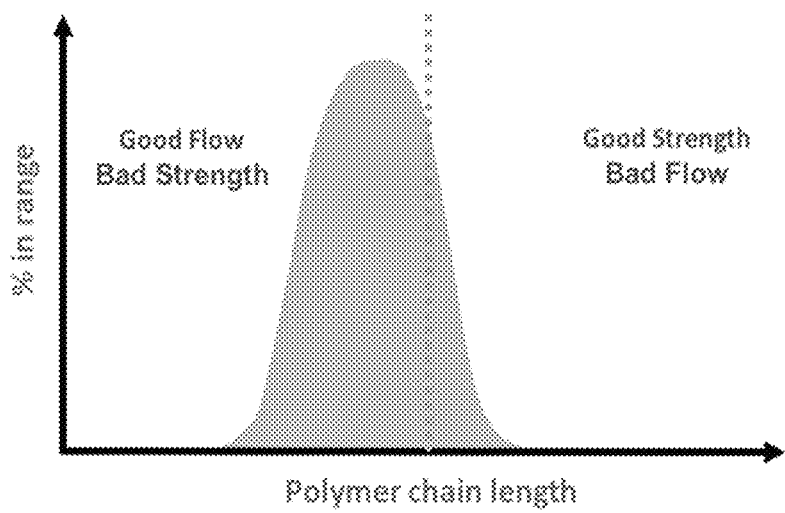
Figure 5C:
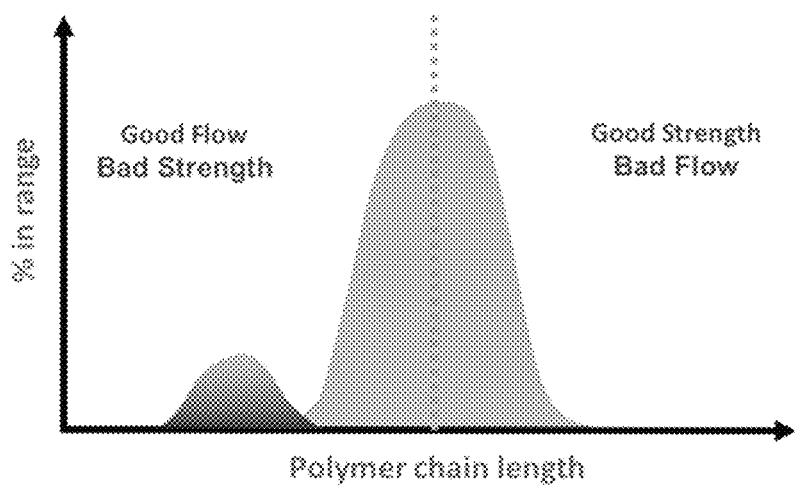

High molecular weight PET chains (HMW PET) give good strength to an article of manufacture, but have poor flow during the processing, which inhibits use in injection molding. Normally, there is a trade-off whereby anything done to improve flow sacrifices strength. This multimodal PET provides good flow and good strength. The bimodal PET (e.g., multimodal) can be considered to be bimodal PET or multimodal PET, which is shown in FIG. 5C, but may be present with or without two or more separate peaks. The blended PET can be considered to be bimodal or multimodal because it is formed from two or more different molecular weight PET compositions, such that the blended PET has at least two different molecular weights blended together. The multimodal PET may, however, only show a single chromatographical peak, but by being formed by blending at least two different PET compositions with different molecular weights is considered to be multimodal to define the multiple different molecular weight PET compositions that are blended. FIG. 5A shows an average molecular weight distribution of normal PET (e.g., HMW PET), where lower weights having good flow but bad strength and higher weights have good strength but bad flow. FIG. 5B shows a lower average molecular weight distribution (e.g., LMW PET) that has more smaller PET polymers having good flow and bad strength. In FIG. 5B the PET polymer chains have been shortened, such as by hydrolysis from the degrading molecule, to give good flow, but the PET has poor strength because the shorter chains are not long enough to entangle effectively. FIG. 5C shows the bimodal PET (e.g., blended PET with two distinct peaks) having a portion with good flow LMW PET and a portion that is normal HMW PET, where the lower molecular weight portion contributes to good flow of the bimodal PET without significantly reducing strength. Additionally, a multimodal PET may have two or more peaks, but may only have one or two peaks in the chromatograph depending on the distributions and amounts. The number of chromatograph peaks does not define the number of modes, but instead the number of different molecular weight PET compositions defines the number of modes (e.g., two or more different molecular weight compositions is multimodal). By producing the low molecular weight, high flow LMW PET, and then combining a small fraction of the LMW PET with virgin, high molecular weight PET, as well as with other molecular weight PETs, it was surprisingly found that the resulting multimodal PET material has very good flow while retaining excellent strength. The diagrams of FIGS. 5A-5C are for illustrative purposes only. The multimodal PET may only show a single chromatographic peak, but includes two, three, four, or more different molecular weight PET compositions blended together.

In some embodiments, the HMW PET can include a polydispersity (e.g., Mw/Mn—polydispersity index) of about 1.55 to about 1.65, or about 1.575 to about 1.625, or about 1.585 to about 1.6, or about 1.595. In some embodiments, the LMW PET can include a polydispersity (e.g., Mw/Mn—polydispersity index) of about 1.4 to about 1.5, or about 1.425 to about 1.475, or about 1.435 to about 1.455, or about 1.45. In some embodiments, the multimodal PET (e.g., 30/70) can include a polydispersity (e.g., Mw/Mn—polydispersity index) of about 1.5 to about 1.575, or about 1.52 to about 1.55, or about 1.525 to about 1.54, or about 1.53.

The polydispersity can be used to quantify the breadth of the distribution curve for each respective composition, such as in reference to FIGS. 5A-5C. The information about the breadth of the distribution curve provides information for the polymers in the composition. A polydispersity of 1 indicates the polymers are all the same length, which is not desirable for the present application. The polydispersity of 1.5 or greater for the multimodal PET indicates that there are both longer chains from the HMW PET and shorter chains from the LMW PET. The data, based in part on the percentages of both HMW PET and LMW PET in the multimodal PET, indicates that there is a larger portion of long chains and a smaller portion of small chains. The result of the polydispersity of the multimodal PET shows a broadened distribution of molecular weights and thereby a broadened distribution of different short polymer chains and long polymer chains. The comparison between the different polydispersity values indicates that the multimodal PET has a wider distribution of small and long chains compared to a composition that only has a distribution from simple cleavage/hydrolysis of the PET. Thus, the polydispersity shows the improvement of having a distribution of LMW PET and a distribution of HMW PET to provide the advantages of each component of the multimodal PET.

The main point is that if we take a PET and cleave it in one step, we get an unacceptable loss of longer chains leading to bad strength. That is what people have tried for decades. Our invention allows retention of most of the longer chains, thus preserving strength.

In some embodiments, the multimodal PET includes an inhomogeneous distribution of the LMW PET throughout the HMW PET. In some instance, the multimodal PET can be prepared without thoroughly mixing the HMW PET and LMW PET together such that there are discrete regions of the HMW PET and discrete regions of the LMW PET. This may be helpful in facilitating processing of the multimodal PET, such as in injection molding where the LMW PET lubricates the movement of the HMW PET.

Alternatively, the multimodal PET includes the LMW PET that is homogeneously distributed throughout the HMW PET. It may be worthwhile to homogeneously mix the LMW PET throughout the HMW PET for some products where consistency and composition is important.

In some embodiments, the multimodal PET includes water at an amount less than 5%, or less than 1%, or less than 0.1%, or a trace amount of water or is devoid of water.

In some embodiments, the multimodal PET has a HMW PET concentration of about 85% to about 55%, about 80% to about 60%, about 75% to about 63%, or about 70% to about 65%.

In some embodiments, the multimodal PET has a LMW PET concentration of about 15% to about 45%, about 20% to about 40%, about 25% to about 37%, or about 30% to about 35%.

In some embodiments, the multimodal PET has a melting temperature between about 240° C. to about 255° C., or about 245° C. to about 250° C., or between 247° C. and 249° C., or about 247.5° C.

In some embodiments, the multimodal PET has an oxygen permeation rate of about 3-6 $CC/(m^2\text{-day})$, +/−25%, 20%, 15%, 10%, 5%, 2%, or 1%.

In some embodiments, the multimodal PET has a crystallization temperature between about 200° C. to about 230° C., or about 210° C. to about 220° C., or about 212° C.

In some embodiments, the multimodal PET has a glass transition temperature of about 70° C. to about 90° C., or about 75° C. to about 85° C., or about 77° C. to about 83° C., or about 79° C. to about 80° C.

In some embodiments, the multimodal PET has a crystal percentage of about 21% to about 25%, or about 22% to about 24%, or about 23% to about 23.5%, or about 23.3%.

Figure 4:
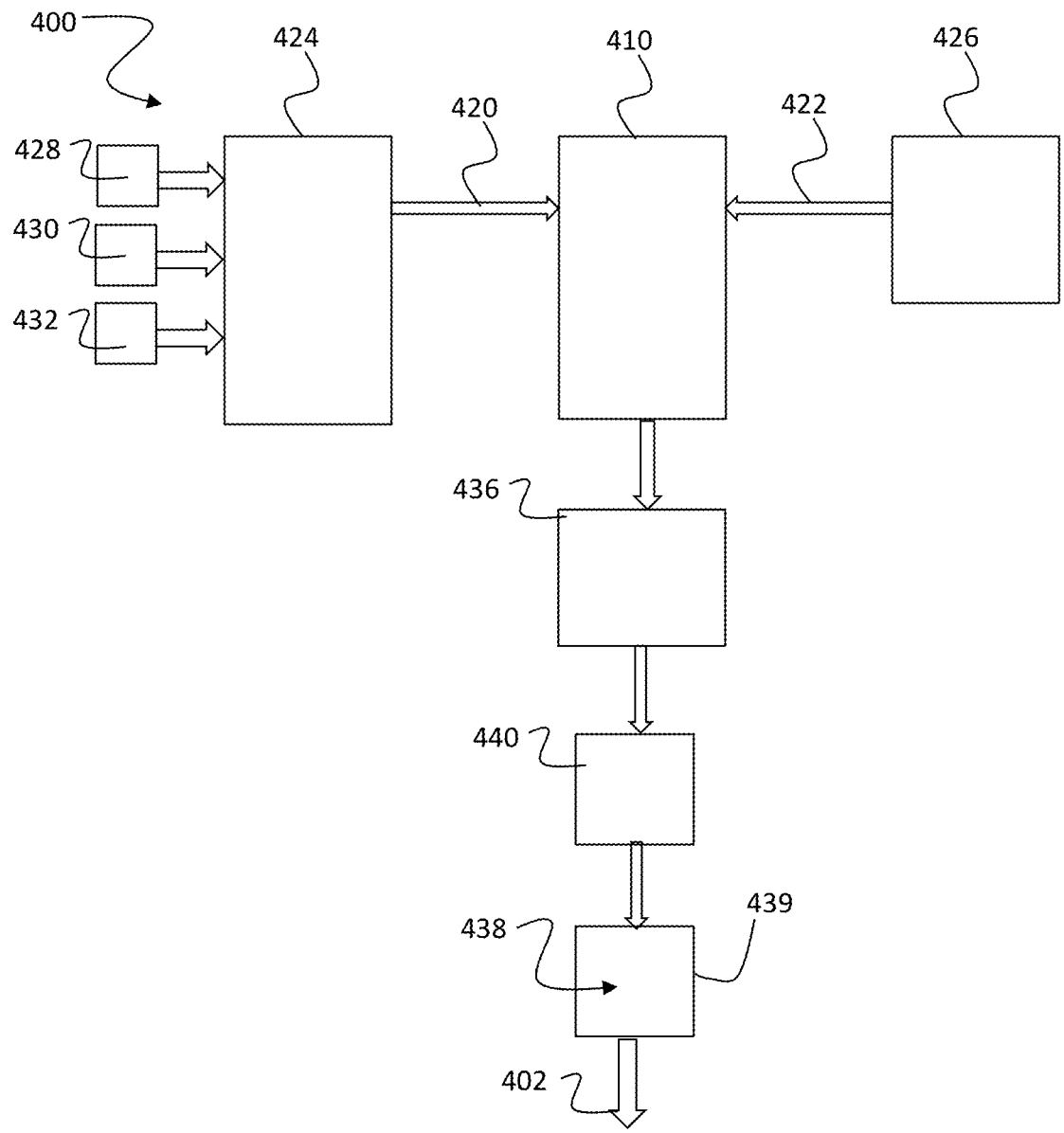
FIG. 4 is a schematic representation of an injection molding system for preparing a PET alloy into an injection molded article.

In some embodiments, the multimodal PET can be used for injection molding to form articles of manufacture. As such, an injection molding system 400 may include a feed of multimodal PET 420, such as shown in FIG. 4, in order to form an injection molded article of manufacture 402 that includes the multimodal PET. The multimodal PET feed 420 may be liquid multimodal PET (e.g., melted multimodal PET). However, the injection molding system 400 may include a multimodal PET heater 424 that heats the multimodal PET feed 420 for flowability as a liquid multimodal PET. The heater 424 may receive multimodal PET as a pellet 428, heated liquid multimodal PET 430, or as any form of PET 432. The heater 424 can provide the multimodal PET feed 420 to an extruder 410. Optionally, a dried and/or filtered multimodal PET pellet feed 422 may be provided to the extruder 410 from a multimodal PET drying and/or filtering device 426.

The multimodal PET can be processed in the injection molding system 400 and through an inline filtration system in the injection molding system. The multimodal PET pellets can be fed into the system 400 through a drying hopper, which in turn feeds an inlet end of a plasticizing screw of the extruder 410. The plasticizing extruding screw is encapsulated in a barrel which is heated by barrel heaters (i.e., the extruder 410). Helical (or other) flights of the screw convey the multimodal PET along an operational axis of the screw. Typically, a root diameter of the screw is progressively increased along the operational axis of the screw in a direction away from the inlet end. Once a desired amount of the multimodal PET melt is accumulated in the extruder, 410 it is transferred into a melt accumulator 440, wherein the melt accumulator 440 can be equipped with an injection plunger, which performs the injection function of the melted multimodal PET into a mold cavity 438.

A melt filter 436 located in fluid communication with and between the extruder 410 and the melt accumulator 440 performs the inline filtration of step. The purpose of the melt filter 436 is to filter impurities and other foreign matters from the multimodal PET material being transferred from the extruder 410 to the melt accumulator 440. The specific implementation for the melt filter is not specifically limited and, as an example, an off-the-shelf filter from Gneuss Inc. of Matthews, N.C. (www.gneuss.com) can be used to implement the melt filter 436.

The inline filtration step may be performed in the melt filter 436 having an inlet for allowing an inflow of the multimodal PET to be filtered, and a filter outlet to allow for an outflow of the filtered multimodal PET. The melt filter 436 includes a filtering member disposed between the filter inlet and filter outlet.

In some embodiments, a mold system can include a mold 439 having a mold cavity 438. The mold 439 receives the multimodal PET so as to fill the mold cavity 438. This is an advance over prior PET that is not sufficiently injected by such an injection molding system. Now, the mold cavity 438 can be completely filled with the multimodal PET without air gaps that ruin an injection molded product. This allows the multimodal PET to be injection molded into a molded PET article of manufacture 402.

The multimodal PET can have PET comprising a first portion of PET polymers having a first average molecular weight and a second portion of PET polymers having a second average molecular weight, wherein the first average molecular weight is less than the second average molecular weight. The multimodal PET can be devoid of talc in the PET. The multimodal PET completely fills the mold cavity 438 of the mold 439.

The systems and methods described herein provide a novel multimodal PET that can be used to prepare a number of PET products, and may be used in various processing techniques, such as injection molding. This allows the multimodal PET to be injected into a mold to form an article having thin walls. Additionally, the multimodal PET allows for injection molding because the cycle time from liquid multimodal PET to solid multimodal PET is significantly reduced compared to PET cycle times.

In the Polyalkylene Terephthalate (PAT) structure above, the "n" may be any reasonable integer, such as 1 (Polymethylene Terephthalate (PMT)), 2 (Polyethylene Terephthalate (PET)), 3 Polypropylene Terephthalate (PPT), 4 (Polybutylene Terephthalate (PBT)), or 5 Polypentylene Terephthalate (PPentT), or the like (e.g., n is 6, 7, 8, 9, 10, etc.). As such, the methods and systems described herein can be adapted for use with any suitable polyalkylene. That is the PET may be substituted with any PAT. The PET in the multimodal PET may be substituted with any PAT so as to form the multimodal PAT. Accordingly, while the systems and methods described herein are directed to PET, such systems and methods may include any reasonable PAT, such as PBT.

Additionally, various degrading molecules can also be used. While water may be used as a degrading molecule, it has been found that alcohols may be better, diols (e.g., two hydroxyls) can be used, and polyols (e.g., 3 or more hydroxyls) can be preferred. Trimethylolpropane is an example small molecule polyol, but other similar polyols can be used. Various small molecule sugar polyols can be used, such as xylitol, pentaerythritol, maltitol, sorbitol, isomalt, and glycerol are examples. In some aspects, thiols, such as methanethiol, ethanethiol, 1-propanethiol, 2-propanethiol, butanethiol, or others can be used as the degrading molecule. Dithiols, such as geminal dithiols, 1,2-dithiols, 1,3-dithiols, and 1,4-dithiols are examples of degrading molecules. Amines, such as methylamine, diethylamine, trimethylamine, ethylamine, aniline, or other amines, may be used as the degrading molecules.

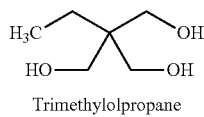

Trimethylolpropane

As described, the method of forming the LMW PET includes cleaving ester bonds in high molecular weight, bottle-grade PET (HMW PET) to create a low molecular weight, very high flow PET (LMW PET). In an example, the process includes adding Trimethylolpropane or other small molecule polyol (e.g., a sugar polyol) or other degrading molecules to the molten PET to cleave the bonds. The degrading molecule can include other alcohols, water, steam, polyols, thiols and amines, such as those listed herein or others. The degrading molecule is a molecule and not a mineral, such as not being talc. The degrading molecule can react and form reaction products as part of the degrading molecule and can be attached to the PET polymers. As such, the LMW PET can include end groups that are reaction products of the degrading molecule.

The degrading molecule can be used at various concentrations to determine the amount of LMW and the low average molecule weight that is obtained. The amount of degrading molecule relative to the amount of HMW PET can be used to obtain a desired amount of LMW with a desired low average molecular weight. Too low a level of degrading molecule results in the chains not broken up sufficiently. Too much degrading molecule results in a low molecular weight material, which may cause problems with smoke generation due to degradation in the extruder. It was found that from 0.25% to about 5% by weight of the total PET composition being degraded can provide for a desired low average molecular weight, where the amount can vary, such as 0.4% to about 4%, about 0.5% to about 3%, about 0.6% to about 2%, about 7% to about 1%, or about 0.75% to about 0.8%, all by weight of the total PET composition. The PET can be any HMW PET composition, such as a HMW PET composition having an intrinsic viscosity of about 0.6 to about 0.95, or about 0.65 to about 0.9, or about 0.7 to about 0.85, or about 0.75 to about 0.78 to about 0.82, or about 0.79 to 0.81, or about 0.8. The standard HMW PET can be described as 0.8 IV PET, which can have the intrinsic viscosity of about 0.81, which within error can range from 0.78 to 0.82 IV. In an example, the degrading molecule (e.g., trimethylolpropane) can be provided as 0.75% by weight degrading molecule in 0.8 IV standard bottle grade PET (HMW PET).

The mechanical properties of LMW PET are poor, especially the strength, due to the low molecular weight, which lowers entanglement density, where entanglements are necessary for good strength. It is surprising and unexpected that the LMW PET having an intrinsic viscosity of about 0.48 can be used as described herein to obtain multimodal PET with an intrinsic viscosity of about 0.5, in order to obtain flowable PET that can be injected molded.

In some embodiments, the method can include diluting very high flow small molecule polyol treated (i.e., trimethylolpropane treated) PET (e.g., LMW PET) at about 10-40% in about 90-60% standard bottle grade PET (e.g., HMW PET). The optimal percentage is around 30-35% very high flow PET (LMW) plus 70-65% standard PET (HMW). That gives the optimal balance of flow and mechanical properties. The multimodal PET under these ranges retains excellent strength, stiffness, Tg, Tm and so on, as shown in the data provided herein. The multimodal PET has been shown to be capable of being used in injection molded different parts, and the resulting parts are very transparent, which is beneficial for uses in many consumer packaging products.

In some embodiments, the HMW that is degraded or used in the multimodal PET mix can be bottle grade PET or recycled PET, as well as off-spec PET. For example, recycled PET has somewhat lower IV and lower molecular weight than virgin HMW PET. The present invention can start with that somewhat degraded recycled PET, and lower the molecular weight even further with processing by the degrading molecule (e.g., Trimethylolpropane). The starting intrinsic value of the HMW PET can determine the amount of degrading molecule and the amount of degradation that is used to obtain the LMW PET, or determine the amount of LMW PET that is mixed with the HMW PET to obtain the multimodal PET.

In some embodiments, a small molecule polyol is a preferred degrading molecule, which has been carefully selected from many potential candidates. The small molecule polyol, such as a sugar polyol, should be cheap, safe, food approved, Kosher, temperature stable, colorless and has a high flash point, making it safe for extrusion. While water can be used as the degrading molecule, extremely low amounts of water would be needed and it would be hard to accurately control dosing. Also, water would evaporate quickly, so it would be hard to get it to react with the PET. Amines oxidize readily and become yellow, which is undesirable. Mercaptans smell bad. One attractive option includes steam dosed into the PET melt to obtain the desired cleavage and resultant LMW PET.

In some embodiments, a method of forming low molecular weight polyalkylene terephthalate (PAT) can include: providing a feed of high molecular weight (HMW) PAT, the HMW PAT having a high average molecular weight; providing a feed of degrading molecule; reacting the HMW PAT with the degrading molecule in a reactor; degrading the HMW PAT with the degrading molecule into low molecular weight (LMW PAT) having a low average molecular weight that is lower than the high average molecular weight; and providing the LMW PAT as output. In some aspects, the degrading molecule cleaves polymer chains of the HMW PAT into smaller polymer chains that contain reaction products of the HMW PAT and degrading molecule. In some aspects, at least a portion of the degrading molecule is unreacted and present in the LMW PAT. In some aspects, the degrading molecule is selected from water, alcohol, diol, polyol, thiol, dithiol, polythiol, amine, and combinations thereof. In some aspects, the degrading molecule is selected from: water in steam form; an alcohol selected from methanol, ethanol, propanol, isopropanol, butanol, n-butanol, isobutanol, tertbutanol, or combinations thereof: a diol selected from ethylene glycol, 1,4-butanediol, propylene-1, 3-diol, beta propylene glycol, methanediol, propane-1,2-diol, alpha propylene glycol, or combinations thereof; a polyol selected from xylitol, pentaerythritol, maltitol, sorbitol, isomalt, lactitol, mannitol, glycerol, trimethylolpropane, polyethylene glycol, or combinations thereof; a thiol selected from methanthiol, ethanthiol, propanthiol, isopropanthiol, butanthiol, n-butanthiol, isobutanthiol, tertbutanthiol, or combinations thereof; a dithiol selected from methanedithiol, 1,1-ethanedithiol, and 1,1-cyclohexanedithiol, 1,3-propanedithiol, dithiothreitol, and combinations thereof; a polythiol selected from a polymer having a plurality of monomers having a thiol; or an amine selected from methylamine, dimethylamine, trimethylamine, ethylamine, aniline, 4-methoxyaniline, N,N-dimethylaniline, 3-nitroaniline, 4-nitroaniline, 4-trifluoromethylaniline, and combinations thereof. In some aspects, the degrading molecule is not talc or other particle. In some aspects, the LMW PAT is devoid of particles.

In some embodiments, the method can include characterizing the LMW PAT to have at least one of: an intrinsic viscosity of about 0.4 to about 0.6; a melting point of about 240° C. to about 247° C.; a glass transition temperature of about 70° C. to about 80° C.; or degrading molecule at about 0.3% to 0.5% by weight of LMW PAT composition. In some aspects, the degrading molecule is provided at about 0.25% to about 5% by weight of the total PAT composition being degraded. In some aspects, the HMW PAT has a characteristic of at least one of: an intrinsic viscosity of about 0.7 to about 0.85; a melting point of about 245° C. to about 255° C.; or a glass transition temperature of about 75° C. to about 85° C.

In some embodiments, a PAT supply receives the PAT feed from one or more of: a PAT reactor system, the PAT reactor system polymerizes the PAT from PAT precursor reagents; a PAT recycling system, the PAT recycling system recycles the PAT from PAT articles; a PAT conditioning system, the PAT conditioning system conditions the PAT for mixing with talc, the conditioning selected from one or more of heating, chopping PAT pellets or sheets or other PAT member, agitating, extruding, drying; off-gassing; or a PAT reservoir, the PAT reservoir having liquid PAT, wherein the liquid PAT is melted PAT.

In some embodiments, the LMW PAT output is provided to an output system that provides the LMW PAT to storage or a multimodal PAT system or an analytical system. The analytical system includes one or more analytical systems performing at least one of: determining intrinsic viscosity of the LMW PAT output; determining flow rate of LMW PAT output; determining melting point of LMW PAT output; determining crystallization temperature of LMW PAT output; determining a differential scanning calorimetry profile of LMW PAT output; or determining heat distortion temperature of LMW PAT output.

In some embodiments, the PAT feed is devoid of another polymer. In some aspects, the degrading molecule is devoid of a particle and/or devoid of another polymer.

In some embodiments, the method can include: drying the PAT feed before mixing with the degrading molecule; and/or drying the degrading molecule before mixing with the PET feed. In some aspects, the method includes polymerizing the PAT from polymerizable reagents. In some aspects, the method can include mixing the PAT and degrading molecule in the mixer. Furthermore, the method can include mixing in anti-static agents, anti-bacterial agents, foaming agents, stabilizers, UV blockers, acetaldehyde scavengers, pigments, lubricants and other typical additives for plastics.

In some embodiments, a system can be provided for performing the method of forming LMW PAT. Such a system can include: a feed line having high molecular weight (HMW) PAT, the HMW PAT having a high average molecular weight; a feedline a of degrading molecule; a reactor having the HMW PAT with the degrading molecule; and an output having low molecular weight (LMW PAT) with a low average molecular weight that is lower than the high average molecular weight.

In some embodiments, a method of forming a multimodal Polyalkylene Terephthalate (PAT) can include: providing a feed of a low molecular weight (LMW) PAT, the LMW PAT having a low average molecular weight; providing a feed of high molecular weight (HMW) PAT, the HMW PAT having a high average molecular weight, wherein the low average molecular weight is a lower distribution than the high average molecular weight; mixing the feed of LMW PAT with the feed of HMW PAT in a mixer to form a multimodal PAT; and providing the multimodal PAT as output. In some aspects, the LMW PAT and/or HMW PAT is devoid of talc or other particles. In some aspects, the HMW PAT is recycled HMW PAT. In some aspects, the LMW PAT has a characteristic of at least one of: an intrinsic viscosity of about 0.4 to about 0.6; a melting point of about 240° C. to about 247° C.; or a glass transition temperature of about 70° C. to about 80° C. In some aspects, the HMW PAT has a characteristic of at least one of: an intrinsic viscosity of about 0.7 to about 0.85; a melting point of about 245° C. to about 255° C.; or a glass transition temperature of about 75° C. to about 85° C. In some aspects, the multimodal PAT includes the LMW PAT at about 10% to about 50% by weight of the multimodal PAT composition. In some aspects, the multimodal PAT includes the LMW PAT at about 30% to about 35% by weight of the multimodal PAT composition. In some aspects, the multimodal PAT has a characteristic of at least one of: an intrinsic viscosity of about 0.5 to about 0.75; a melting point of about 245° C. to about 248° C.; or a glass transition temperature of about 77° C. to about 81° C. In some aspects, the multimodal PAT has a degrading molecule at about 0.1% to about 0.3% by weight, wherein the degrading molecule is selected from water, alcohol, diol, polyol, thiol, dithiol, polythiol, amine, and combinations thereof.

In some embodiments, the mixing is performed with a mixer capable of mixing PAT in a batch or continuous formats, such as a single screw mixer, double-screw mixer, continuous kneader, reciprocating screw mixer, twin-screw extruder, continuous plow mixer, or combinations thereof. In some aspects, the mixer also performs one or more of: degassing, homogenizing, dispersing, or heating. In some aspects, the mixing in the mixer includes mixing in anti-static agents, anti-bacterial agents, foaming agents, stabilizers, UV blockers, acetaldehyde scavengers, pigments, lubricants and other typical additives for plastics.

In some embodiments, the method includes providing the multimodal PAT output to an output system, wherein the output system provides the multimodal PAT to storage or an analytical system or a manufacturing system. In some aspects, the analytical system includes one or more analytical systems capable of: determining intrinsic viscosity of melted multimodal PAT output; determining flow rate of melted multimodal PAT output; determining melting point of multimodal PAT output; determining crystallization temperature of multimodal PAT output; determining a differential scanning calorimetry profile of multimodal PAT output; or determining heat distortion temperature of multimodal PAT output. In some aspects, the method includes converting the multimodal PAT output into an article of manufacture, the method comprising converting the multimodal PAT output into the article of manufacture.

In some embodiments, the method can include drying the HMW PAT feed and/or LMW PAT before mixing.

In some embodiments, a system for forming a multimodal PAT can include: a feed of a low molecular weight (LMW) PAT, the LMW PAT having a low average molecular weight; a feed of high molecular weight (HMW) PAT, the HMW PAT having a high average molecular weight, wherein the low average molecular weight is a lower distribution than the high average molecular weight; a mixer having the LMW PAT and HMW PAT; and an output having multimodal PAT. In some aspects, the system can include an output operably coupled to an outlet of the mixer, wherein the output is selected from a container, pump, flow line, heater, cooler, extruder, die, pelletizer, mixer, and combinations thereof. In some aspects, the LMW PAT and/or HMW PAT is devoid of talc or other particles.

In some embodiments, the system can include: a PAT reactor system that polymerizes the HMW PT from PAT precursor reagents; a PAT recycling system that recycles the PAT from PAT articles; a PAT conditioning system that conditions the HMW PAT for mixing with LMW PAT, the conditioning selected from one or more of heating, chopping PAT pellets or sheets or other PAT member, agitating, extruding, drying; off-gassing; or a PAT reservoir of liquid PAT, wherein the liquid PAT is melted PAT.

In some embodiments, the mixer is any mixer capable of mixing liquid PAT in batch or continuous formats, such as a single screw mixer, double-screw mixer, continuous kneader, reciprocating screw mixer, twin-screw extruder, continuous plow mixer, or combinations thereof. In some aspects, the mixer is configured to perform one or more of: degassing, homogenizing, dispersing, or heating.

In some embodiments, the system can include storage, and/or an analytical system; and/or a manufacturing system. In some aspects, the analytical system includes one or more analytical systems capable of: determining intrinsic viscosity of melted multimodal PAT output; determining flow rate of melted multimodal PAT output; determining melting point of multimodal PAT output; determining crystallization temperature of multimodal PAT output; determining a differential scanning calorimetry profile of multimodal PAT output; or determining heat distortion temperature of multimodal PAT output.

In some embodiments, a manufacturing system is configured to convert the multimodal PET output into an article of manufacture, such as injection molding. In some aspects, the manufacturing system can include: an optional component input feed, the optional component input feed being configured to provide an optional component, the optional component being selected from a filler, $TiO_2$, second polymer, glass pellets, glass fibers, glass particles, sodium ionomers, sodium stearate, nucleating agent, anti-static agents, anti-bacterial agents, foaming agents, stabilizers, UV blockers, acetaldehyde scavengers, pigments, lubricants and other typical additives for plastics, polycarbonate, polybutylene terephthalate (PBT) or other PAT (e.g., PET), or other component of a PAT article of manufacture. Here, it is clear that the additives are added to the multimodal PAT and not to the LMW PAT or the HMW PAT. In some aspects, the manufacturing system comprising one or more of: a multimodal PAT feed; one or more flow channels containing flowable multimodal PAT; a mixer; heating system; an extruder system that produces multimodal PAT extrudate; pumping system; injection molding system; and/or cooling system.

In some embodiments, a multimodal PAT composition can include: a low average molecular weight of a low molecular weight (LMW) PAT; a high average molecular weight of a high molecular weight (HMW) PAT mixed with the LMW PAT to form the multimodal PAT, wherein the multimodal PAT is devoid of talc. In some aspects, the LMW PAT is present at about 10% to about 50% by weight of the multimodal PAT composition. In some aspects, the multimodal PAT having a characteristic of at least one of: an intrinsic viscosity of about 0.5 to about 0.75; a melting point of about 245° C. to about 248° C.; or a glass transition temperature of about 77° C. to about 81° C.

In some embodiments, the multimodal PET can have a ratio of intrinsic viscosity of the HMW PET to LMW PET, such as an example being the IV ratio being 0.8:0.4 (HMW: LMW). However, other HMW:LMW IV ratios can be 0.7: 0.3 to about 0.9 to about 0.5, from about 0.75:0.35 to about 0.85:0.45; or about 0.78 to about 0.43, or about 0.79 to about 0.41. In another example, the IV ratio can be about 0.8±0.025:0.4±0.025; 0.8±0.05:0.4±0.05, or 0.8±0.075: 0.4±0.075.

In some embodiments, the LMW PAT has a characteristic of at least one of: an intrinsic viscosity of about 0.3 to about 0.6, from about 0.35 to about 0.55, from about 0.36 to about 0.5, from about 0.37 to about 0.45, or from about 0.38 to about 0.42.

In some embodiments, the multimodal PET can be configured for injection molding. The polymeric composition for injection molding can include about 30% LMW PET and about 70% HMW PET (e.g., resin having an intrinsic viscosity of about 0.8), which results in about 0.225% sugar polyol in the polymeric composition. However, it should be recognized that modifications to the amounts of the components may also be suitable, such as +/−10%, 5%, 2%, or 1%.

EXPERIMENTAL

The LMW PET was first prepared from the HMW PET to make a masterbatch of the LMW PET. The LMW PET is then mixed with the HMW PET to form the multimodal PET having the LMW distribution and the HMW distribution.

The data provided herein shows characteristics of the HMW PET (e.g., 0.81 IV PET), LMW PET, and multimodal PET (30% LMW PET+70% HMW PET) as well as other multimodal PETs. It should recognized that the values can vary, such as 1%, 2.5%, 5%, 10%, 15%, or up to 25%. Also, the values for the multimodal PET can vary when the relative amounts of LMW and HMW PETs are varied.

In these examples, PET resin supplied 0.8 IV. About 0.75% of glycerol was let down into PET to produce the clear flow LMW PET Masterbatch. About 30% of LMW PET masterbatch was then dry blended with 70% PET resin (e.g., 0.8 I.V.). This results in 0.225% of glycerol in the final recipe. Various ranges of glycerol were tested that resulted in the final multimodal PET having glycerol at about 0.15%, 0.188%, 0.263%, or 0.225% by weight of the total composition. The glycerol at 0.225% by weight (e.g., 30% LMW and 70% HMW) has the best combination of flow and mechanical properties. Mechanical tests have been conducted comparing the PET compositions. All tests indicate that the multimodal PET formulation is able to keep the beneficial strength properties along with improved flow, which can be useful in injection molding. However, it should be recognized that a different degrading molecule can be used, which may be retained in the multimodal PET.

3-Point Flexural Test

Testing was conducted on an Instron 3366 unit with Bluehill Universal software applying principles of ASTM D 790, Procedure A—Flexural Properties of Unreinforced and Reinforced Plastics and Electrical Insulating Materials, Procedure A, with samples size: 0.125" thickness×0.5" width× 5.0" length; support span: 2 inches; and number of specimens tested per sample type: 5 at each strain rate. The experiments included the test conditions: Speed—0.05 in./min, Span —2.0 in. The following results were obtained.

Neat PET:

| Sample Control | Thickness (in) | Width (in) | Flex Modulus (PSI) | Peak Stress (PSI) | Strain at Peak Stress (%) |
|---|---|---|---|---|---|
| 1 | 0.125 | 0.497 | 378766.5 | 12740.1 | 4.90 |
| 2 | 0.125 | 0.497 | 376833.3 | 12788.4 | 4.80 |
| 3 | 0.125 | 0.497 | 362793.1 | 12558.1 | 4.75 |
| 4 | 0.125 | 0.497 | 364460.4 | 12454.0 | 4.80 |
| 5 | 0.125 | 0.497 | 365603.7 | 12698.1 | 4.89 |
| Avg. | 0.125 | 0.497 | 369691.4 | 12647.7 | 4.83 |
| S.D. | 0 | 0 | 7500.4 | 138.2 | 0.06 |

Multimodal 30/70 PET (e.g., with 30% LMW and 70% HMW PET)

| Sample Control | Thickness (in) | Width (in) | Flex Modulus (PSI) | Peak Stress (PSI) | Strain at Peak Stress (%) |
|---|---|---|---|---|---|
| 1 | 0.124 | 0.496 | 384351.1 | 12693.7 | 4.7 |
| 2 | 0.124 | 0.496 | 384941.2 | 12649.0 | 4.7 |
| 3 | 0.124 | 0.496 | 383342.3 | 12622.8 | 4.7 |
| 4 | 0.124 | 0.496 | 372743.5 | 12656.4 | 4.8 |
| 5 | 0.124 | 0.496 | 385810.7 | 12948.5 | 4.8 |
| Avg. | 0.124 | 0.496 | 382237.7 | 12714.1 | 4.7 |
| S.D. | 0 | 0 | 5382.9 | 133.5 | 0.1 |

Multimodal 35/65 PET (e.g., with 35% LMW and 65% HMW PET)

| Sample Control | Thickness (in) | Width (in) | Flex Modulus (PSI) | Peak Stress (PSI) | Strain at Peak Stress (%) |
|---|---|---|---|---|---|
| 1 | 0.125 | 0.497 | 378766.5 | 12740.1 | 4.8 |
| 2 | 0.125 | 0.497 | 376833.3 | 12788.4 | 4.8 |
| 3 | 0.125 | 0.497 | 362793.1 | 12558.1 | 4.8 |
| 4 | 0.125 | 0.497 | 364460.4 | 12454.0 | 4.8 |
| 5 | 0.125 | 0.497 | 365603.7 | 12698.1 | 4.9 |
| Avg. | 0.125 | 0.497 | 369691.4 | 12647.7 | 4.8 |
| S.D. | 0 | 0 | 7500.4 | 138.2 | 0.1 |

Tensile Test

Testing was conducted on an Instron 3366 unit with Bluehill Universal software applying principles from ASTM D638 Tensile Properties of Plastics. A 10 kN load cell was used. A long-travel extensometer was used to determine strain values. A clip-on 2" gauge/0.2" travel extensometer was used for the Filled PET sample for more accuracy at low strain values. Crosshead Speed: 2.0 inches/minute. Sample Size: ASTM Type I Dog bone Sample Gauge Length: 2.0 inches. Number of specimens tested per sample type: 5 (minimum). The results were obtained and presented in the tables below, with the penultimate row being the average of the column, and the ultimate row being the standard deviation.

Neat PET

| Thickness (in) | Width (in) | Modulus (PSI) | Yield Stress (PSI) | Elongation at Yield (%) | Break Stress (PSI) | Elongation at Break (%) |
|---|---|---|---|---|---|---|
| 0.127 | 0.499 | 268096.4 | 8398.9 | 4.5 | 484.8 | 65.2 |
| 0.127 | 0.499 | 331609.0 | 8172.3 | 4.2 | 1.3 | 38.6 |
| 0.127 | 0.499 | 316743.4 | 8179.9 | 5.0 | 3948.7 | 330.4 |
| 0.127 | 0.499 | 409901.2 | — | — | 1204.2 | 3.4 |
| 0.127 | 0.499 | 402685.4 | 8005.4 | 4.1 | 809.2 | 90.0 |
| 0.127 | 0.499 | 345807.1 | 8189.5 | 4.5 | 1289.6 | 105.5 |
| 0 | 0 | 60059.2 | 161.4 | 0.4 | 1550.5 | 129.7 |

Multimodal 30/70 PET (e.g., with 30% LMW and 70% HMW PET)

| Thickness (in) | Width (in) | Modulus (PSI) | Yield Stress (PSI) | Elongation at Yield (%) | Break Stress (PSI) | Elongation at Break (%) |
|---|---|---|---|---|---|---|
| 0.124 | 0.499 | 369055.3 | 8532.3 | 4.1 | 8021.2 | 5.5 |
| 0.124 | 0.499 | 447242.6 | 8528.0 | 4.0 | 2522.0 | 45.4 |
| 0.124 | 0.499 | 381640.6 | 8379.7 | 3.9 | 3311.5 | 69.9 |
| 0.124 | 0.499 | 423836.7 | 8549.7 | 4.7 | 1314.8 | 57.7 |
| 0.124 | 0.499 | 407254.5 | 8605.5 | 4.1 | 996.9 | 69.4 |
| 0.124 | 0.499 | 405805.9 | 8519.0 | 4.2 | 3233.3 | 49.6 |
| 0 | 0 | 31538.8 | 83.8 | 0.3 | 2833.7 | 26.6 |

Multimodal 35/65 PET (e.g., with 35% LMW and 65% HMW PET)

| Thickness (in) | Width (in) | Modulus (PSI) | Yield Stress (PSI) | Elongation at Yield (%) | Break Stress (PSI) | Elongation at Break (%) |
|---|---|---|---|---|---|---|
| 0.124 | 0.499 | 525858.5 | 8469.6 | 3.8 | 3024.9 | 52.4 |
| 0.124 | 0.499 | 465180.5 | 8420.3 | 3.7 | 534.4 | 88.1 |
| 0.124 | 0.499 | 539968.1 | 8542.5 | 3.7 | 1272.3 | 72.1 |
| 0.124 | 0.499 | 343042.3 | 8581.9 | 4.1 | 3101.1 | 52.2 |
| 0.124 | 0.499 | 446905.3 | 8566.0 | 3.7 | 916.8 | 66.4 |
| 0.124 | 0.499 | 464191.0 | 8516.1 | 3.8 | 1769.9 | 66.2 |
| 0 | 0 | 78297.3 | 68.6 | 0.2 | 1209.3 | 15.0 |

Notched Izod Impact Test

Testing was conducted on a Ceast Resil 25 Digital Pendulum Unit, Model 6545 per ASTM D 256: Standard Test Methods for Determining the Izod Pendulum Impact Resistance of Plastics, Method A. Pendulum Capacity: 2.00 Joule Sample Size: dimensions Notch depth: 0.1 in. Number of specimens tested per sample type: 5 (minimum). Test Temperature: Samples were at room temperature 22° C. during testing. The results for a notched impact test were obtained and presented in the tables below, with the penultimate row being the average of the column, and the ultimate row being the standard deviation.

Neat PET

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.240 | 0.024 | 0.136 | 34.568 | 0.647 | C |
| 3.250 | 0.024 | 0.184 | 49.231 | 0.922 | C |
| 3.240 | 0.024 | 0.132 | 33.333 | 0.624 | C |
| 3.250 | 0.024 | 0.116 | 28.308 | 0.530 | C |
| 3.260 | 0.024 | 0.128 | 31.902 | 0.597 | C |
| 3.248 | 0.024 | 0.139 | 35.468 | 0.664 | |
| 0.008 | 0.000 | 0.026 | 8.043 | 0.151 | |

Multimodal 30/70 PET (e.g., with 30% LMW and 70% HMW PET)

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.190 | 0.024 | 0.144 | 37.618 | 0.704 | C |
| 3.180 | 0.024 | 0.108 | 26.415 | 0.495 | C |
| 3.180 | 0.024 | 0.104 | 25.157 | 0.471 | C |
| 3.180 | 0.024 | 0.120 | 30.189 | 0.565 | C |
| 3.180 | 0.024 | 0.120 | 30.189 | 0.565 | C |
| 3.182 | 0.024 | 0.119 | 29.913 | 0.560 | |
| 0.004 | 0.000 | 0.016 | 4.857 | 0.091 | |

Multimodal 35/65 PET (e.g., with 35% LMW and 65% HMW PET)

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.180 | 0.024 | 0.132 | 33.962 | 0.636 | C |
| 3.170 | 0.024 | 0.124 | 31.546 | 0.591 | C |
| 3.180 | 0.024 | 0.120 | 30.189 | 0.565 | C |
| 3.190 | 0.024 | 0.120 | 30.094 | 0.564 | C |
| 3.180 | 0.024 | 0.120 | 30.189 | 0.565 | C |
| 3.180 | 0.024 | 0.123 | 31.196 | 0.584 | |
| 0.007 | 0.000 | 0.005 | 1.660 | 0.031 | |

Definitions of Failure Classification: C=complete break (a break where the specimen separates into two or more pieces); H=Hinge Break (an incomplete break, such that one part of the specimen cannot support itself above the horizontal when the other part is held vertically); P=Partial Break (an incomplete break that does not meet the definition for a hinge break but has fractured at least 90% of the distance between the vertex of the notch and the opposite side); and NB=Non-Break (an incomplete break where the fracture extends less than 90% of the distance between the vertex of the notch and the opposite side). These definitions are the same for the unnotched impact test.

The results for an unnotched impact test were obtained and presented in the tables below, with the penultimate row being the average of the column, and the ultimate row being the standard deviation.

Neat PET

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.260 | 0.024 | 5.456 | 1666.258 | 31.203 | NB |
| 3.250 | 0.024 | 5.456 | 1671.385 | 31.299 | NB |
| 3.260 | 0.024 | 5.456 | 1666.258 | 31.203 | NB |
| 3.260 | 0.024 | 5.456 | 1666.258 | 31.203 | NB |
| 3.250 | 0.024 | 5.456 | 1671.385 | 31.299 | NB |
| 3.256 | 0.024 | 5.456 | 1668.308 | 31.242 | |
| 0.005 | 0.000 | 0.000 | 2.808 | 0.053 | |

Multimodal 30/70 PET (e.g., with 30% LMW and 70% HMW PET)

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.260 | 0.024 | 5.456 | 1666.258 | 31.203 | NB |
| 3.250 | 0.024 | 5.456 | 1671.385 | 31.299 | NB |
| 3.260 | 0.024 | 5.456 | 1666.258 | 31.203 | NB |
| 3.260 | 0.024 | 5.456 | 1666.258 | 31.203 | NB |
| 3.250 | 0.024 | 5.456 | 1671.385 | 31.299 | NB |
| 3.256 | 0.024 | 5.456 | 1668.308 | 31.242 | |
| 0.005 | 0.000 | 0.000 | 2.808 | 0.053 | |

Multimodal 35/65 PET (e.g., with 35% LMW and 65% HMW PET)

| Width (mm) | Windage (J) | Energy Absorbed (J) | Impact Resistance (J/m) | Impact Resistance (ft-$_{lb}$/in) | Type of Failure (C, H, NB, P) |
|---|---|---|---|---|---|
| 3.260 | 0.024 | 5.456 | 1666.258 | 31.203 | NB |
| 3.250 | 0.024 | 5.456 | 1671.385 | 31.299 | NB |
| 3.260 | 0.024 | 5.456 | 1666.258 | 31.203 | NB |
| 3.260 | 0.024 | 5.456 | 1666.258 | 31.203 | NB |
| 3.250 | 0.024 | 5.456 | 1671.385 | 31.299 | NB |
| 3.256 | 0.024 | 5.456 | 1668.308 | 31.242 | |
| 0.005 | 0.000 | 0.000 | 2.808 | 0.053 | |

Gardner Impact Test

Gardner impact testing was performed on a BYK Gardner Impact Tester, catalog number 1G1120 and conducted per ASTM D 5420. Tester was bolted to concrete floor. Geometry: GC; Height increments: 1 in Test temperature: 23° C. The failure mode was a ductile failure, with the dart penetrating the sheet. Dart strikes sheet first.

| Sample Type | Average Thickness (in) | MFH (in) | W (lb) | Mean Failure Energy (in*lb) | Mean Failure Energy (J) | Type of Failure* |
|---|---|---|---|---|---|---|
| Neat PET | — | — | 4 | — | — | N/A |
| 30% LMW PET 70% HMW PET | — | — | 4 | — | — | N/A |
| 35% LMW PET 65% HMW PET | 0.125 | 13.3 | 1 | 13.3 | 1.50 | b |

The neat PET and 30% LMW PET 70% HMW PET maxed out the Gardner impact tester with a 4 lb load and the max testing height of 40 inches. Type of failure: a=crack or cracks on one surface only (the plaque could still hold water); b=cracks that penetrate the entire thickness (water would probably penetrate through the plaque); or c=brittle shatter (the plaque is in several pieces after impact) d=ductile failure (the plaque is penetrated by a blunt tear).

Intrinsic Viscosity Testing and Results

Intrinsic Viscosity: ASTM 4603-96. Solvent: Phenol/Tetrachloroethane (60/40 w/w). Temperature: 30° C. Concentration: 0.5 g/dL

| Sample ID | IV +/− 0.02 (dL/g) |
|---|---|
| Neat PET | 0.713 |
| 30% LMW PET 70% HMW PET | 0.517 |
| 35% LMW PET 70% HMW PET | 0.520 |

Ratios of LMW/HMW Multimodal PET

The amount of the LMW PET was varied to study performance characteristics. The % sample include: 20% LMW PET and 80% HMW PET; 25% LMW PET and 75% HMW PET; 30% LMW PET and 70% HMW PET; and 35% LMW PET and 65% HMW PET. The data in FIG. 6 shows that varying the ratios of LMW/HMW between 20/80 and 35/65 still provides multimodal PET that can be used in injection molding. It was found that the 30/70 ratio provided optimal results.

Resin Characterization and Comparison

The HMW PET resin with an intrinsic viscosity of 0.81 (e.g., 0.81 IV Resin) was compared to a LMW PET master batch and the multimodal PET (e.g., 30% LMW PET+70% HMW PET resin). The results are shown in following table.

| Properties analyzed | UOM | HMW PET | LMW PET | 30% LMW PET + 70% HMW PET resin |
|---|---|---|---|---|
| Intrinsic viscosity (IV) | dl/g | 0.786 | 0.477 | 0.518 |
| Melting Point temperature (MP) | ° C. | 248 | 244.9 | 247.3 |
| Glass Transition temperature (Tg) | ° C. | 80.9 | 77.1 | 79.8 |
| End group (COOH) | mmol/kg | 22.98 | 35.22 | 53.83 |
| Antimony (Sb) | ppm | 259 | 253 | 245 |
| Acetaldehyde (AA) | ppm | 0.6 | 2.6 | 3.53 |
| % Crystallinity analyzed by DSC | % | 20.7 | 20.1 | 23.32 |
| Mn | Da or g/mol | 8874 | 5912 | 5886 |
| Mw | Da or g/mol | 14163 | 8533 | 8998 |
| Mz | Da or g/mol | 22975 | 12112 | 13269 |
| Mw/Mn (Poly dispersity Index) | No Unit (Ratio) | 1.596 | 1.443 | 1.529 |

The intrinsic viscosity, melting point, and glass transition are provided to show the differences between the HMW PET, LMW PET, and the multimodal PET. However, it should be recognized that variations in the ratio of LMW PET to HMW Pet can cause variations in these values.

The data also shows that the LMW PET and the multimodal PET have more COOH end groups compared to the HMW PET. The multimodal PET also has a higher percentage crystallinity compared to HMW PET and LMW PET.

As shown, it is clear that the HMW PET has a higher molecular weight compared to the LMW PET as evidenced by the Mn, Mw, and Mz. The molecular weight of the multimodal PET results from the molecular weight of the HMW PET and the LMW PET. Also, the polydispersity (e.g., Mw/Mn polydispersity index) of the multimodal PET at 1.529 is within a suitable range compared to the polydispersity of the HMW PET at 1.596 and the LMW PET 1.443. The value of the polydispersity of the multimodal PET provides the benefits for using the multimodal PET as described herein.

Normal PET has good strength but poor flow, thereby inhibiting its use in injection molded articles, especially thin-walled articles. Intentional random chain scission lowers molecular weight, thereby improving flow but creating an unacceptable loss of strength. Our invention creates a molecular weight distribution whereby most of the longer chains are retained while introducing some very small chains to improve flow. The resulting balance of flow and strength is highly desirable and has eluded PET manufacturers for decades. Thus, the polydispersity provides the favorable combination of a larger number of long chains with a smaller chains to short chains to retain strength and increase flowability.

Accordingly, it is expected that changes to the ratio may result in changes to the values in the table of +/−25%, 20%, 15%, 10%, 5%, 2%, or 1%.

Injection Molding

Injection molding experiments were performed with a control being standard HMW PET having an intrinsic viscosity of 0.71 and a test multimodal PET having an intrinsic viscosity of 0.56. These PET compositions were processed by injection molding under similar conditions as shown in FIGS. 7A (Control) and 7B (ClearFlow; multimodal PET). As can be seen, the multimodal PET uses a significantly lower switchover press at 270 Bar, which is about half of the 550 Bar of the Control. Also, the hydraulic press of 27 Bar max for the multimodal PET is significantly less than the 55 Bar max of the Control. Thus, the multimodal PET provides for better injection molding due to better flowability so that less injection pressure can be used. For example, it is thought that the hydraulic press with the multimodal PET can be less than or about 45 Bar, less than or about 40 Bar, less than or about 35 Bar, less than or about 30 Bar, less than or about 25 Bar, less than or about 20 bar, or possibly even less with optimized flowability. This shows a significant advance in injection molding with the multimodal PET over the control PET. This lower injection pressure can be used for various benefits, such as reducing cycle time, reducing thickness of walls of injection molded materials, faster injection, and other advances. The result is a product with the multimodal PET that is mechanically just as good as the control PET, but with improved processing and injection molding.

Resulting injection molded bottles from the multimodal PET are clear and indistinguishable from control PET. Thus, visually, the multimodal PET can replace the control PET. The bottle dimensions and bottle capacity were found to be substantially similar. Additionally, the sidewall density and crystallinity was measured to be about the same for the control PET and the multimodal PET. The bottle material distribution was also found to be substantially similar between the control PET and the multimodal PET.

The sidewall tensile data for the bottles shows comparable results. The control PET had a sidewall tensile data modulus of $8.32 \times 10^5$ psi compared to the multimodal PET having a sidewall tensile data modulus of $8.33 \times 10^5$ psi. The control PET had a peak load of 21.85 lbf compared to the multimodal PET having the peak load at 19.80, which is not much different from the control. The control PET and multimodal PET had a similar stress at yield of $1.7 \times 10^4$ psi.

The empty vented top load experiment shows the multimodal PET having sufficient qualities to be used as a bottle. The empty vented top load of 20 inches per minute resulted in the control PET having a first peak at 15.09 lbf, max load at 15.09 lbf, and load at deflection of 9.05 lbf, where the multimodal PET had a first peak at 11.42 lbf, max load at 12.44 lbf, and load at deflection of 11.47 lbf.

The filled capped top load experiment shows the multimodal PET having sufficient qualities to be used as a bottle. The filled capped top load of 0.5 inches per minute resulted in the control PET having a first peak at 123 lbf, max load at 123 lbf, and load at deflection of 50.51 lbf, where the multimodal PET had a first peak at 110 lbf, max load at 110 lbf, and load at deflection of 51.10 lbf. Here, the data shows the multimodal PET is improved.

The filled bottle sidewall rigidity mid label crush strength experiment shows the multimodal PET having sufficient qualities to be used as a bottle. The filled bottle sidewall rigidity mid label crush strength experiment resulted in the control PET having a first peak at 3.22 lbf, max load at 14.7 lbf, and load at deflection of 14.62 lbf, where the multimodal PET had a first peak at 3.67 lbf, max load at 14.6 lbf, and load at deflection of 14.53 lbf.

The color of the injected molded products was compared to each other. Both appear to be clear. The data indicated the haze absorption being about 5.4 for the control PET and about 4.37 for the multimodal PET. The lower value is less haze or more clarity. Thus, the multimodal PET can provide for better clarity or less haze compared to the control PET.

All chemistry terms are defined as known in the art.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A multimodal polyalkylene terephthalate (PAT) comprising:
    a low molecular weight (LMW) PAT having a low average molecular weight; and
    a high molecular weight (HMW) PAT having a high average molecular weight mixed with the LMW PAT to form the multimodal PAT, wherein the low average molecular weight is lower than the high average molecular weight,
    wherein the multimodal PAT is devoid of talc,
    wherein the multimodal PAT has a glass transition temperature of about 77° C. to about 81° C.

2. The multimodal PAT of claim 1, wherein the LMW PAT is present at about 10% to about 50% by weight of the multimodal PAT.

3. The multimodal PAT of claim 1, wherein the HMW PAT is present at about 90% to about 50% by weight of the multimodal PAT.

4. The multimodal PAT of claim 1, wherein the multimodal PAT is devoid of another type of polymer.

5. The multimodal PAT of claim 1, wherein the multimodal PAT has an intrinsic viscosity of about 0.45 to about 0.75.

6. The multimodal PAT of claim 1, wherein the multimodal PAT has a melting point of about 240° C. to about 255° C.

7. The multimodal PAT of claim 1, wherein the LMW PAT and HMW PAT are inhomogeneously mixed, with regions of LMW PAT and regions of HMW PAT.

8. The multimodal PAT of claim 1, wherein the LMW PAT and HMW PAT are homogeneously mixed.

9. The multimodal PAT of claim 1, comprising less than 5% water by weight in the multimodal PAT.

10. The multimodal PAT of claim 1, the multimodal PAT includes a degrading molecule at less than or about 0.3% by weight.

11. The multimodal PAT of claim 1, wherein the multimodal PAT has one or more of the following:
    filler, $TiO_2$, glass pellets, glass fibers, glass particles, sodium ionomers, sodium stearate, nucleating agent, polycarbonate, polybutylene terephthalate (PBT) or other polyalkylene terephthalate (PAT).

12. The multimodal PAT of claim 1, wherein the multimodal PAT is formed into an injection molded article.

13. The multimodal PAT of claim 1, wherein the PAT is Polyethylene Terephthalate (PET).

14. A multimodal polyalkylene terephthalate (PAT) comprising:
    a low molecular weight (LMW) PAT having a low average molecular weight; and
    a high molecular weight (HMW) PAT having a high average molecular weight mixed with the LMW PAT to form the multimodal PAT, wherein the low average molecular weight is lower than the high average molecular weight,
    wherein the multimodal PAT is devoid of talc,
    the multimodal PAT has a polydispersity of about 1.5 to about 1.575;
    the HMW PAT having a polydispersity of about 1.55 to about 1.65; and
    the LMW PAT having a polydispersity of about 1.4 to about 1.5.

15. The multimodal PAT of claim 14, wherein the PAT is Polyethylene Terephthalate (PET).

16. A multimodal polyalkylene terephthalate (PAT) comprising:
    a low molecular weight (LMW) PAT having a low average molecular weight; and
    a high molecular weight (HMW) PAT having a high average molecular weight mixed with the LMW PAT to form the multimodal PAT, wherein the low average molecular weight is lower than the high average molecular weight,
    wherein the multimodal PAT is devoid of talc,
    wherein the multimodal PAT has an oxygen permeation rate of about 3-6 $CC/(m^2$-day), +/−25%.

17. The multimodal PAT of claim 16, wherein the PAT is Polyethylene Terephthalate (PET).

18. A multimodal polyalkylene terephthalate (PAT) comprising:
    a low molecular weight (LMW) PAT having a low average molecular weight; and
    a high molecular weight (HMW) PAT having a high average molecular weight mixed with the LMW PAT to form the multimodal PAT, wherein the low average molecular weight is lower than the high average molecular weight,
    wherein the multimodal PAT is devoid of talc,
    wherein the multimodal PAT has a crystallization temperature of about 200° C. to about 230° C.

19. The multimodal PAT of claim 18, wherein the PAT is Polyethylene Terephthalate (PET).

20. A multimodal polyalkylene terephthalate (PAT) comprising:
    a low molecular weight (LMW) PAT having a low average molecular weight; and
    a high molecular weight (HMW) PAT having a high average molecular weight mixed with the LMW PAT to form the multimodal PAT, wherein the low average molecular weight is lower than the high average molecular weight,
    wherein the multimodal PAT is devoid of talc,
    wherein the multimodal PAT has a crystal percentage of about 21% to about 25%.

21. The multimodal PAT of claim 20, wherein the degrading molecule is selected from the group consisting of water, alcohol, diol, polyol, thiol, dithiol, polythiol, amine, and combinations thereof.

22. The multimodal PAT of claim 20, wherein the PAT is Polyethylene Terephthalate (PET).

* * * * *